US012798892B2

(12) United States Patent
Znbaqa

(10) Patent No.: US 12,798,892 B2
(45) Date of Patent: Nov. 17, 2026

(54) CAP FEEDER

(71) Applicant: Express Scripts Strategic Development, Inc., St. Louis, MO (US)

(72) Inventor: Marwan Znbaqa, Phoenix, AZ (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 122 days.

(21) Appl. No.: 18/829,470

(22) Filed: Sep. 10, 2024

(65) Prior Publication Data

US 2025/0122024 A1 Apr. 17, 2025

Related U.S. Application Data

(60) Provisional application No. 63/543,774, filed on Oct. 12, 2023.

(51) Int. Cl.
*B65G 47/08* (2006.01)

(52) U.S. Cl.
CPC .... *B65G 47/084* (2013.01); *B65G 2203/0225* (2013.01); *B65G 2203/042* (2013.01)

(58) Field of Classification Search
None
See application file for complete search history.

(56) References Cited

U.S. PATENT DOCUMENTS 3,899,081 A 8/1975 Shotbolt
3,908,341 A 9/1975 Conti
4,099,609 A * 7/1978 Kieronski ............ B65H 67/061 198/397.06
4,214,656 A 7/1980 McDonald
4,445,310 A 5/1984 Scheidegger
4,895,243 A 1/1990 Graham
5,778,740 A 7/1998 Tye
5,924,546 A 7/1999 Funaya
6,142,039 A 11/2000 Herring, Sr.
6,477,919 B1 11/2002 Thomas
6,502,688 B1 1/2003 Krooss
6,676,266 B2 1/2004 Dromaretsky
7,040,489 B2 * 5/2006 Zemlin .................... G07D 3/16 209/924
7,421,831 B2 9/2008 Neeper
(Continued)

FOREIGN PATENT DOCUMENTS

CN 203955573 U 11/2014
FR 2706584 B1 7/1996
(Continued)

*Primary Examiner* — Kavel Singh
(74) *Attorney, Agent, or Firm* — Stinson LLP

(57) ABSTRACT

A cap feeder to supply caps for a bottle includes a cap track defining a cap pathway along which the caps move, one after another and a cap orientation detector arranged to be contacted by the caps as the caps move along the cap pathway. The cap orientation detector can be configured to detect when one cap of the caps is in a first orientation and is arranged to stop said one cap in the first orientation from continuing to move along the cap pathway. The cap can be ejected from the cap pathway. The cap orientation detector can be configured to permit one cap of the caps in a second orientation to continue to move along the cap pathway, past the cap orientation detector. In an example, the cap orientation detector is configured to rotate about an axis of rotation.

22 Claims, 20 Drawing Sheets

(56) References Cited

U.S. PATENT DOCUMENTS

| | | | | |
|---|---|---|---|---|
| 7,694,846 | B2 | 4/2010 | Yuyama | |
| 7,730,608 | B2 | 6/2010 | Kvalheim | |
| 7,861,671 | B2 | 1/2011 | Carter | |
| 8,276,741 | B1 | 10/2012 | Zittel | |
| 8,522,717 | B2 | 9/2013 | Carter | |
| 8,672,251 | B2 | 3/2014 | Aries | |
| 8,783,439 | B2 * | 7/2014 | Lopez | B65G 47/1471 198/397.01 |
| 9,049,875 | B2 | 6/2015 | Ewald | |
| 9,221,271 | B2 | 12/2015 | Eller | |
| 10,011,438 | B2 * | 7/2018 | Bonino | B65G 47/1471 |
| 10,273,134 | B1 | 4/2019 | Ramnarain | |
| 10,501,268 | B2 * | 12/2019 | Roth | B65G 47/1471 |
| 10,800,565 | B1 | 10/2020 | Joplin | |
| 10,968,046 | B2 * | 4/2021 | Schaeffer | B67B 3/0645 |
| 2009/0026648 | A1 | 1/2009 | Stevenson | |
| 2009/0151305 | A1 | 6/2009 | Cassoni | |
| 2009/0166153 | A1 | 7/2009 | Dotson | |
| 2017/0073206 | A1 | 3/2017 | Parsons | |
| 2018/0105294 | A1 | 4/2018 | Abboud | |
| 2020/0156914 | A1 | 5/2020 | Businaro | |

FOREIGN PATENT DOCUMENTS

| | | | |
|---|---|---|---|
| GB | 1299164 | A | 12/1972 |
| GB | 2058030 | A | 4/1981 |

* cited by examiner

CAP FEEDER

CROSS-REFERENCE TO RELATED APPLICATIONS

This application claims the benefit of U.S. Provisional Application No. 63/543,774, filed Oct. 12, 2023, the entire disclosure of which is incorporated by reference.

FIELD

The present disclosure relates to cap feeder, and more particularly to a cap feeder that detects the orientation of a cap.

BACKGROUND

High volume pharmacies process and fulfill a large number of prescription orders per day. These pharmacies often rely on automated systems to process, fill, and pack one or more prescriptions together for delivery to a patient. These automated systems, such as high-volume fillers, automatically fill pharmaceutical containers (e.g., auto-filled containers) with specific quantities of pharmaceuticals. After the containers are filled, a capper will apply a cap to each container, thereby sealing the pharmaceuticals contained therein. A supply of caps is provided to the capper with a cap feeder. A conventional cap feeder 1 for a capper is generally shown in FIG. 1. This cap feeder 1 generally comprises a track or chute that delivers a single-file row of caps to the capper.

BRIEF DESCRIPTION OF THE DRAWINGS

Corresponding reference characters indicate corresponding parts throughout the drawings.

DETAILED DESCRIPTION

Figure 2:
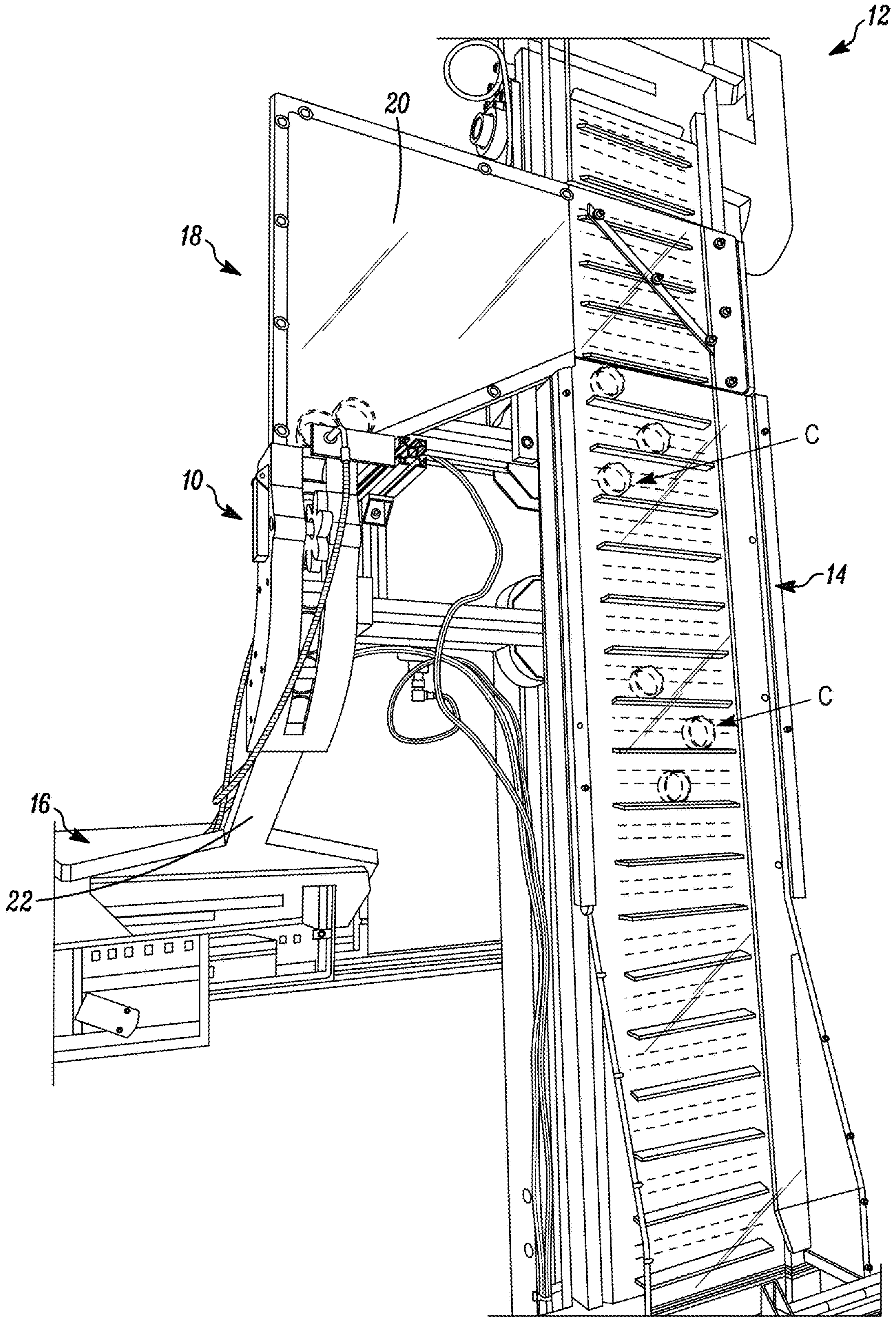
FIG. 2 is an image of a cap feeder according to one embodiment of the present disclosure in a cap feeding system.

Referring to FIG. 2, one embodiment of a cap feeder according to the present disclosure is generally indicated by reference numeral 10. The cap feeder 10 is part of a capping system or device 12 for applying or capping bottles (broadly, containers) with caps C. The capping system 12 includes a hopper or bin (not shown) for holding a plurality of caps C, a cap elevator 14 for moving the caps out of the hopper, a capper 16 for applying the caps to the bottles, and a cap conveyor 18 for transferring the caps from the cap elevator to the capper. In this embodiment, the cap feeder 10 is part of the cap conveyor 18. Other configurations of the capping system 12, including other arrangements and configurations of the cap feeder 10, are within the scope of the present disclosure. For example, the cap elevator 14 may be of a type that generally only picks up and moves caps when they are in a specific orientation. The cap elevator 14 includes a continuous material handling belt with horizontal cleats defining rows and engaging cap(s) and lift the cap(s) from the bin. The elevator 14 may engage and lift multiple caps in a row, as defined by a cleat. In the illustrated embodiment, the cap conveyor 18 delivers a single file row of caps C to the capper 16 (1×N, where N is an integer). The caps C move under the influence of gravity through the cap conveyor 18 toward the capper 16. The cap conveyor 18 includes an elevated guide section 20 that receives the caps C from the cap elevator 14 and guides the caps to the cap feeder 10. The cap conveyor 18 also includes a capper section 22 that receives the caps C from the cap feeder 10 and guides the caps to the capper 16. Other configurations of the cap conveyor are within the scope of the present disclosure. Although generally described in the context of pharmacies, it is understood the cap feeder 10 of the present disclosure can be used in other contexts where caps are applied to bottles or containers.

Figure 3:
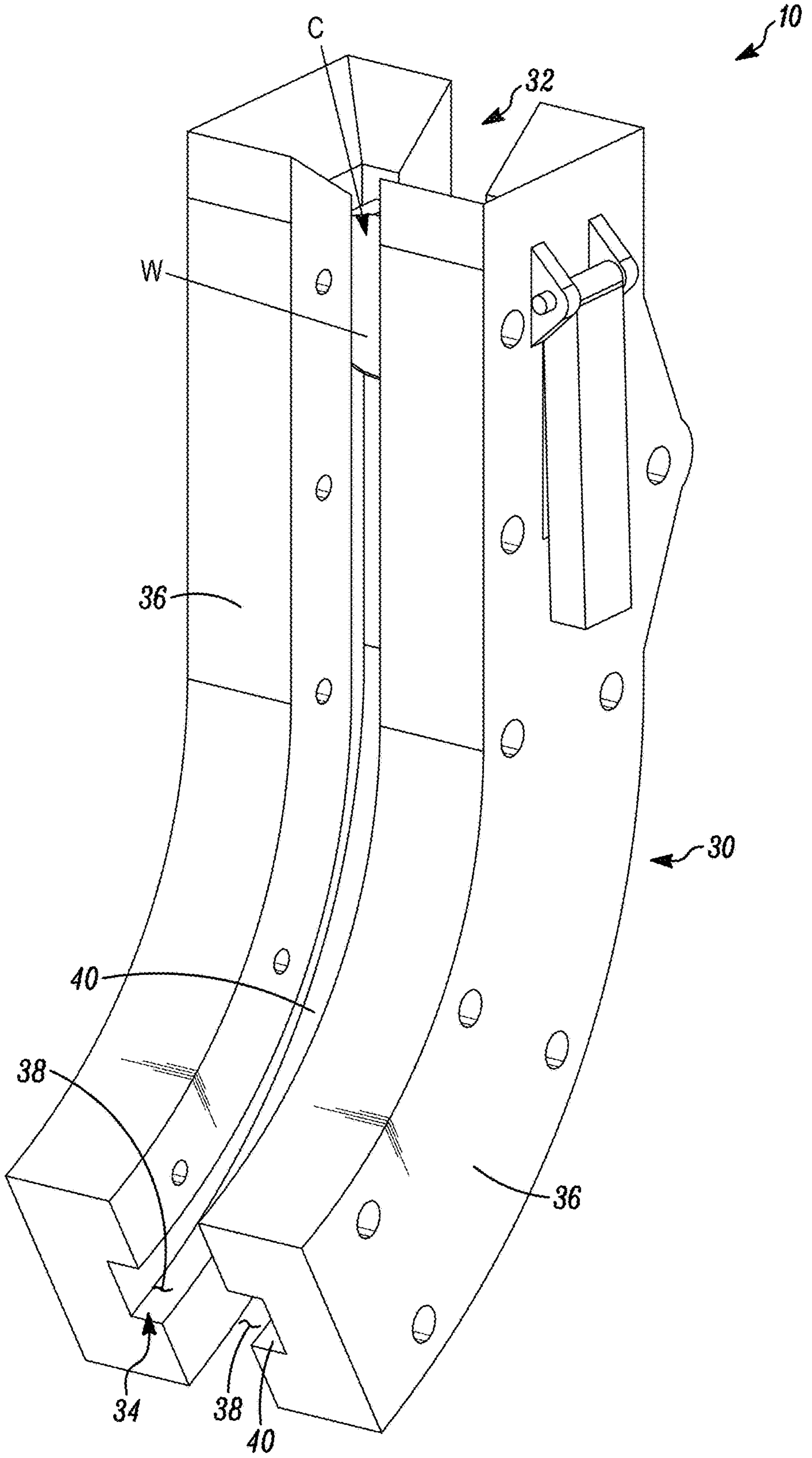
FIG. 3 is a front perspective of the cap feeder.
Figure 4:
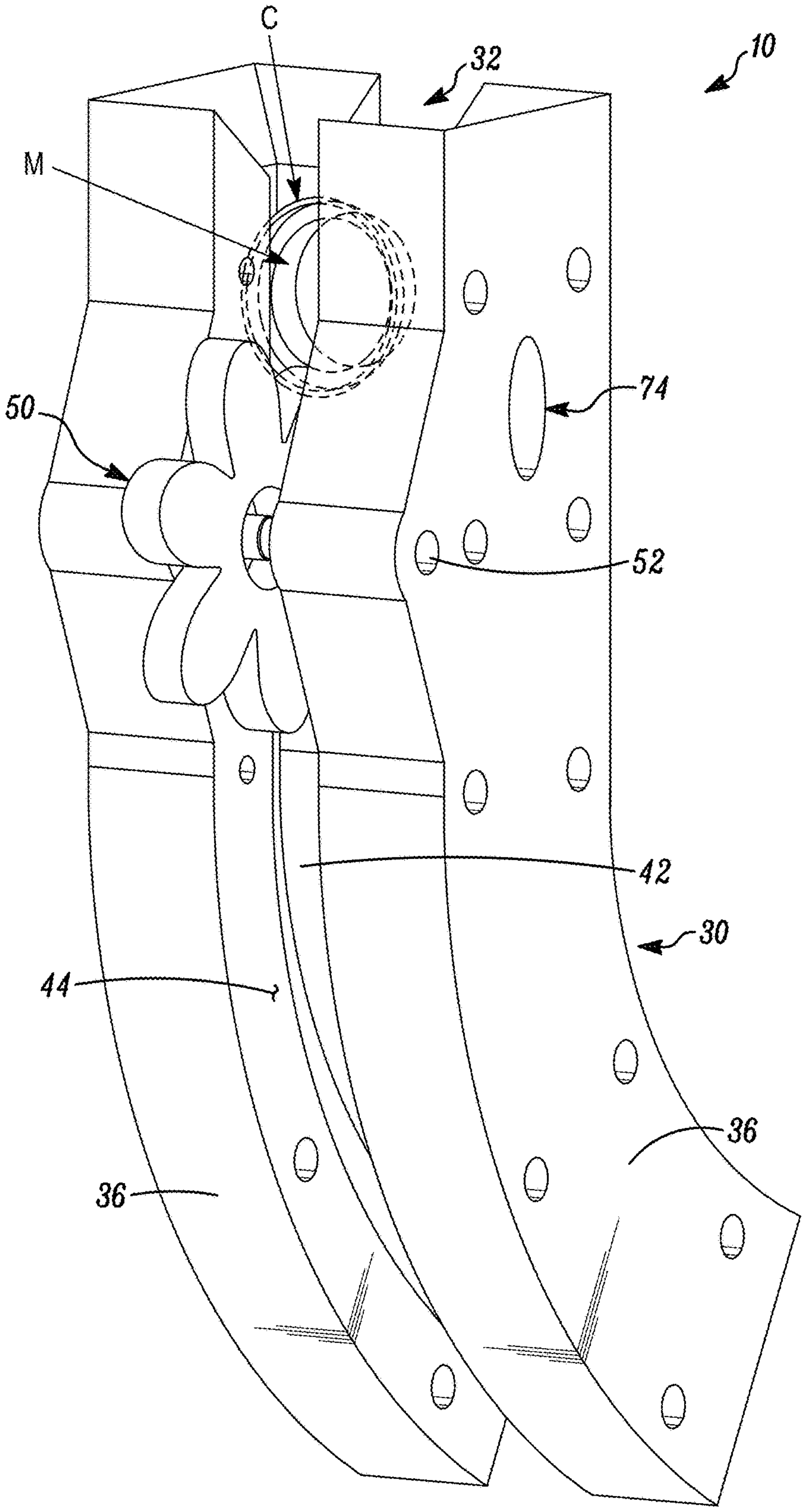
FIG. 4 is a rear perspective of the cap feeder.
Figure 5:
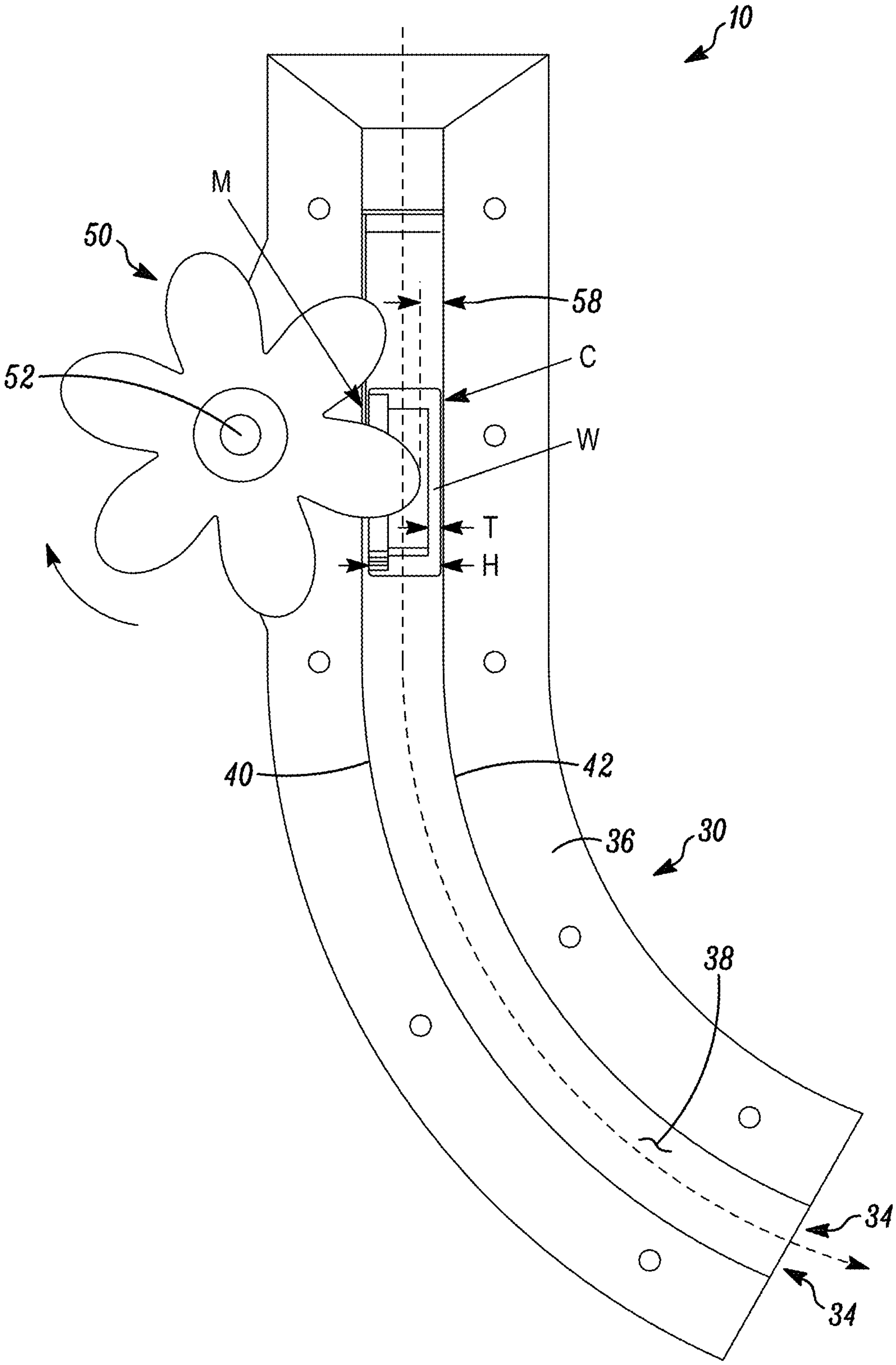
FIG. 5 is a cross-section of the cap feeder.
Figure 6:
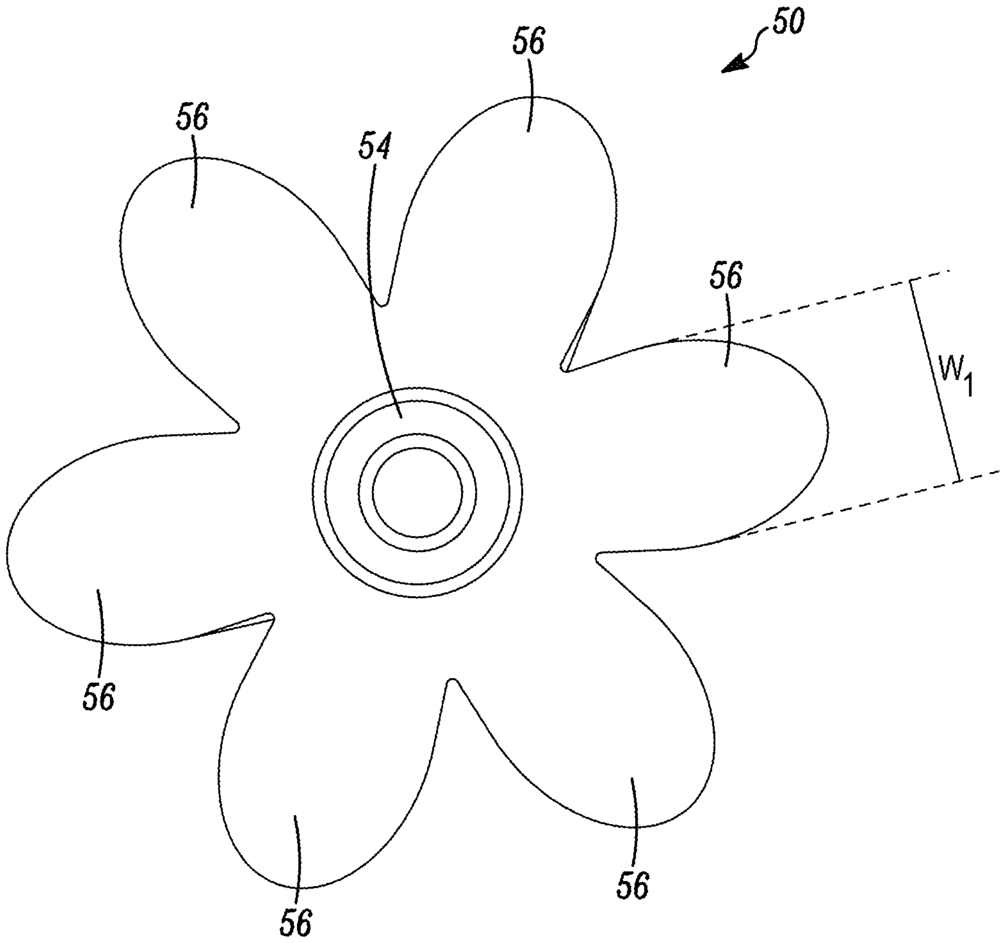
FIG. 6 is a plan view of a cap orientation detector.

Referring to FIGS. 3-5, the cap feeder 10 supplies the caps C. The cap feeder 10 includes a cap track 30 that supports and guides the caps C as the cap moves along the cap feeder 10 toward the capper 16. The cap track 30 includes or defines a cap pathway CP (FIG. 5) along which the caps move, one after another in a single file line (i.e., 1×N, where N is an integer). The cap track 30 includes a cap inlet 32 that receives the caps C and a cap outlet 34 that supplies or dispenses the caps toward the capper 16. The cap pathway CP extends between the cap inlet 32 and the cap outlet 34. The cap inlet 32 is disposed above the cap outlet 34 and the cap pathway CP is arranged such that the caps C move from the cap inlet to the cap outlet along the cap pathway under the influence of gravity. Because the caps C can move via gravity, the cap track 30 does not need a cap mover, such as a conveyor, that moves the caps along the cap pathway CP. However, in other embodiments, a cap mover may be included. In the illustrated embodiment, the cap track 30 includes two rails or supports 36. In an example, the rails 36 are essentially mirror images of each other, especially where the caps C travel. Each rail 36 includes a groove 38. The two rails 36 are arranged relative to one another such that the grooves 38 face each other and extend parallel to each other. Together the grooves 38 define the cap pathway CP. In an example, the groves 36 are essentially mirror images of each other. The grooves 38 are sized and shaped to receive a portion (e.g., a side) of the caps C and to permit the caps to slide along the grooves. Each groove 38 includes opposing first and second track surfaces 40, 42. A distance between the first and second track surfaces 40, 42 is the thickness of the cap pathway CP and a distance between the base of each groove 38 is the width of the cap pathway. The width of the cap pathway CP and the thickness of the cap pathway is slightly larger than a dimension of the cap, e.g., greater than the diameter of a cap C. In an example, slightly larger is at least 0.1 mm, 0.2 mm, 0.5 mm longer than the dimension of the cap C. The caps C (e.g., portions thereof) fit between the first and second track surfaces 40, 42 and generally slide thereon. The first and second track surfaces 40, 42 are stationary and do not move, the caps C simply slide along them. The respective first and second track surfaces 40, 42 of each rail 36 are aligned and flush with one another. The cap track 30 includes a channel or recess 44. The channel 44 extends along the cap pathway CP. In the illustrated embodiment, the two rails 36 are spaced apart to define the channel 44. In an example, the channel 44 has a width that is equal to the depths of the grooves 38. In an example, the channel 44 has a width that is less than to the depths of the grooves 38. The channel width is set such that the caps C cannot fall into the channel when a cap is shifted fully into one groove or the other. In an example, the cap C may only enter the groove at the cap inlet 32. In an example embodiment, the cap C may only exit the groove at the cap outlet 34. Other configurations of the cap track are within the scope of the present disclosure.

Referring to FIGS. 4-7B, the cap feeder 10 includes a cap orientation detector 50 (e.g., a star, flower wheel, or flower spinner). An example embodiment of the cap orientation detector 50 is a plurality of ray florets surrounding a central hub. The cap orientation detector 50 is configured to detect whether or not each cap C that passes through the cap feeder 10 is in a first, wrong orientation (broadly, detect whether or not each cap is in a wrong orientation or in a second, correct orientation). By detecting whether or not each cap C is in a wrong orientation or correct orientation, the cap feeder 10 prevents caps in the wrong orientation from reaching the capper 16. The cap track 30 (specifically, the grooves 38) are configured so that the caps C can only be in one of two orientations when disposed in and moving along the cap track: (1) the wrong orientation or (2) the correct orientation. The "orientation" of a cap may be considered to refer to the direction the mouth M of the cap C faces. As used herein, the phrase "correct orientation" refers to a cap C that is in the orientation required by the capper in order for the capper to be able to apply the cap to a bottle. As used herein, the phrase "wrong orientation" refers to a cap C that is not in the orientation required by the capper in order for the capper to be able to apply the cap to the bottle. Typically, the wrong orientation will be an inverse of the correct orientation (e.g., the cap is flipped over from the correct orientation). Cappers 16 typically need to receive caps C in a particular orientation in order to be able to apply the caps to the bottles. In the illustrated embodiment, the correct orientation for the caps being supplied to the capper 16 is an orientation in which the mouths M of the caps C face generally downward when the caps are delivered to the capper. Further, the orientation of the caps C does not change between the cap feeder 10 and the capper 16 (in general, the orientation the caps are in when they are picked up by the cap elevator 14 will be the orientation of the caps when they reach the capper). Thus, the caps C passing through the cap feeder 10 need to be in the correct orientation. If a cap C in the wrong orientation reaches the capper 16, the capper may jam or try to apply the cap to a bottle, which will not be successful and result in the bottle remaining uncapped.

The cap orientation detector 50 is supported by the cap track 30. The cap orientation detector 50 is at least partially positioned in the channel 44 of the cap track 30. The cap track 30 includes a shaft 52 extending between the two rails 36. The cap orientation detector 50 is mounted on the shaft 52. The shaft 52 defines an axis of rotation. The cap orientation detector 50 is configured to rotate about the axis of rotation. In particular, the cap orientation detector 50 is freely rotatable about the axis of rotation. In an example embodiment, the cap orientation detector 50 is unpowered, i.e., it is not connected to a motor or electrically powered. The cap orientation detector 50 may include a bearing 54. The bearing 54 is mounted on the shaft 52 and permits the cap orientation detector 50 to more easily rotate about the axis of rotation. The cap orientation detector 50 is arranged to be contacted (and rotated) by the caps C as the caps move along the cap pathway CP. It is through this engagement with the caps C that the cap orientation detector 50 is able to detect the orientation of each cap. As the caps C move along the cap pathway CP, under the influence of gravity, the cap orientation detector 50 selectively permits or prevents the caps from moving along the cap pathway based on their orientation. The cap orientation detector 50 is configured to permit the caps C in the correct orientation to continue to move along the cap pathway, past the cap orientation detector. The cap orientation detector 50 is arranged to stop the caps C in the wrong orientation from continuing to move along the cap pathway CP, past the cap orientation detector. In this manner, a cap C is in the wrong orientation if the cap orientation detector 50 inhibits the cap from continuing to move along the cap pathway CP and a cap is in the correct orientation if the cap orientation detector permits the cap to continue moving along the cap pathway.

Figure 7A:
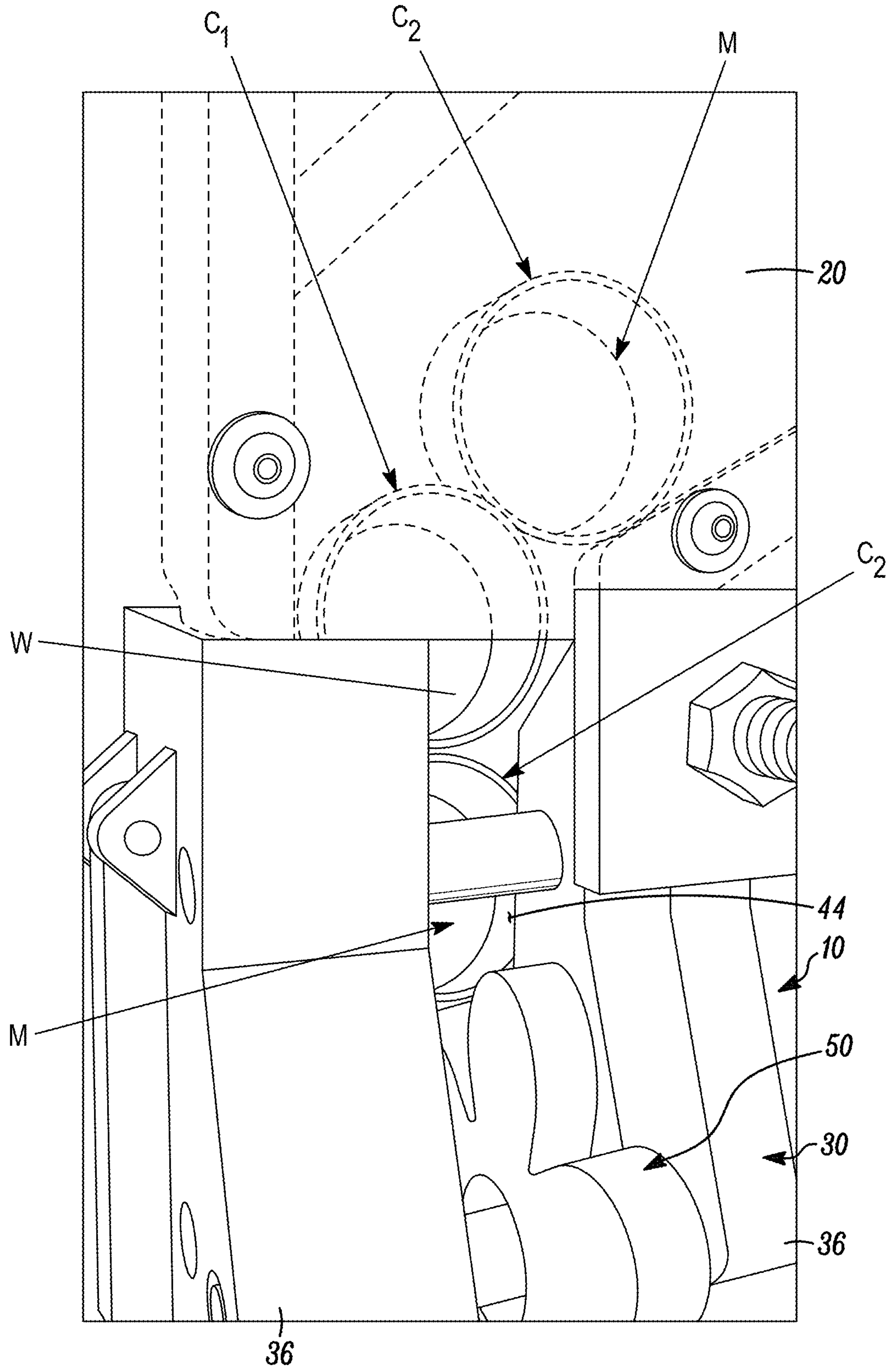
FIG. 7A is an image of the cap feeder with a plurality of caps, one of which is in the wrong orientation.
Figure 7B:
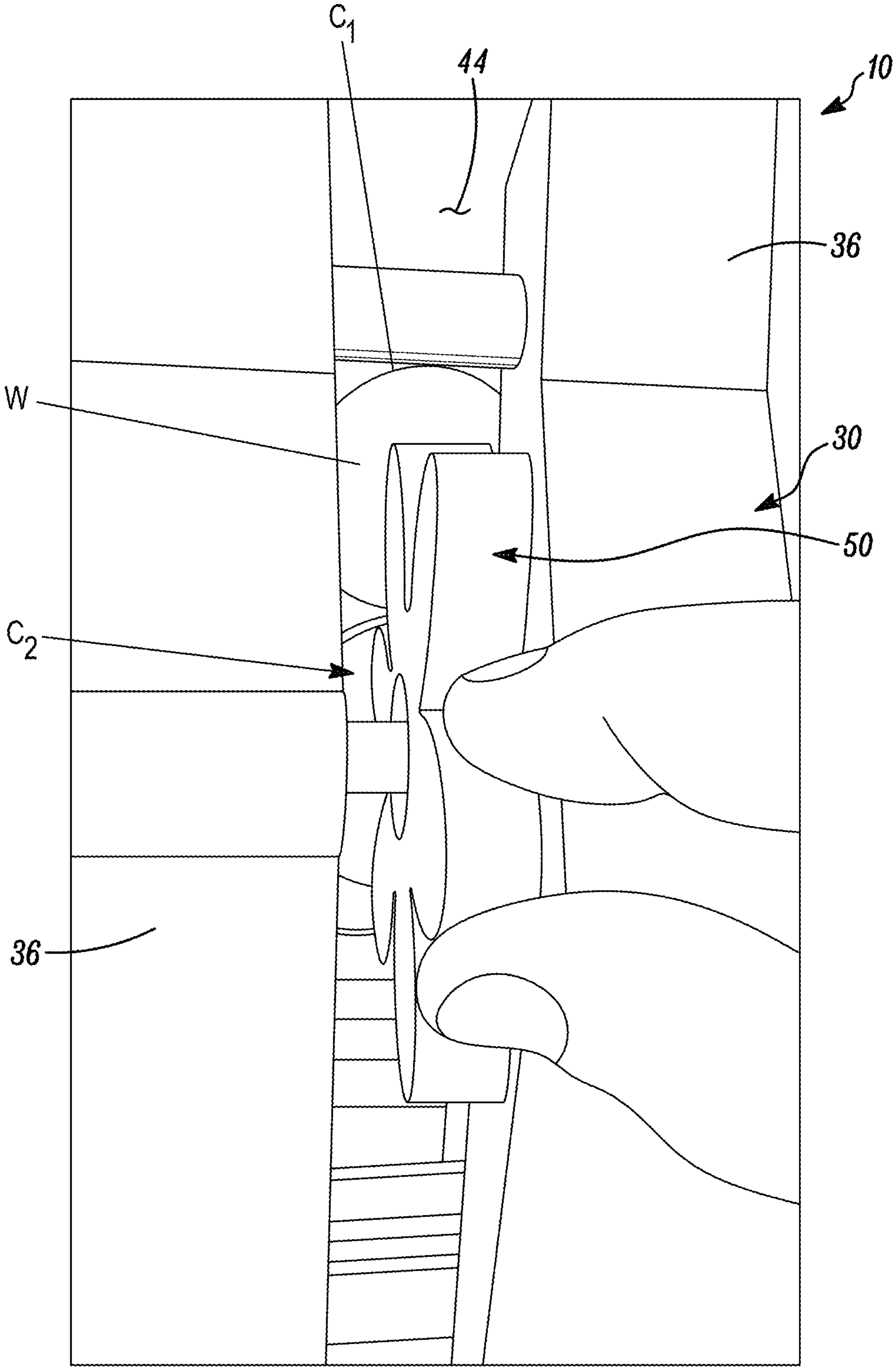
FIG. 7B is an image of the cap orientation detector detecting the cap in the wrong orientation.

In the illustrated embodiment, the cap orientation detector 50 is arranged relative to the cap pathway CP in such a way that the caps C in the wrong orientation are oriented so that the mouths M of these caps face away from the cap orientation detector when these caps contact the cap orientation sensor. Likewise, the cap orientation detector 50 is arranged relative to the cap pathway CP in such a way that the caps C in the correct orientation are oriented so that the mouths M of these caps face toward the cap orientation detector when these caps contact the cap orientation detector. In FIGS. 7A and 7B, the cap C labeled as "$C_1$" is in the wrong orientation and the caps labeled as "$C_2$" are in the correct orientation. In FIG. 5, the cap C is in the correct orientation.

The cap orientation detector 50 includes a plurality of projections, lobes or spokes 56. The lobes 56 extending radially outwardly from a central hub. In an example embodiment the lobes 56 are radically symmetrical about the central hub. The central hub includes an aperture at its center through which the shaft 52 extends. The central hub also receives the bearing 54. In an example, the lobes 56 are cantilevered from the central hub. In the illustrated embodiment, the cap orientation detector 50 includes six lobes 56, although more or fewer lobes are within the scope of the present disclosure. The lobes 56 are all generally identical. The lobes 56 have a length greater than their width. The lobes 56 are evenly spaced apart about the axis of rotation and the center aperture. Each lobe 56 is symmetrical about a radial axis extending from the axis of rotation. The lobes 56 are configured such that there is always one lobe arranged to be contacted by the caps C (e.g., disposed in the cap pathway CP) as the caps move along the cap pathway. In addition, the lobes 56 are configured relative to the size of the caps C such that two successive caps C cannot move past the cap orientation detector 50 without coming into contact with or engaging one of the lobes 56. In one embodiment, the length of the arc between the tips of adjacent lobes 56 is about equal to the diameter of the cap C. This ensures that each cap C (in the 1×N array of caps) will contact the cap orientation detector 50. Each lobe 56 is sized and shaped to be able to extend into the mouths M of the caps C. In the illustrated embodiment, each lobe 56 has a rounded end at the cantilevered free end remote from the central hub. The rounded end helps facilitate the insertion of the lobe 56 into the mouth M of the cap C as the cap moves along the cap pathway, and thereby the movement of the cap past the cap orientation detector (when the cap is in the correct orientation). The exact size (e.g., width $W_1$) of the lobes 56 will depend upon the size (e.g., diameter) of the mouth M of the caps C being fed by the cap feeder, but in one embodiment the lobes 56 have a width $W_1$ that is about half the size of the diameter of the mouths M of the caps C (as generally shown in FIG. 5). In one embodiment, the width $W_1$ is about 87 mm. In the illustrated embodiment, the thickness of each lobe 56 is constant as the lobes extend outward from the central hub.

The lobes 56 of the cap orientation detector 50 detect the orientation of each cap C. Each lobe 56 is sized and shaped such that each lobe extends into the cap pathway CP, when the cap orientation detector 50 is rotated accordingly. However, the lobes 56 are not sized and shaped to extend through the cap pathway CP. The lobes 56 permit the caps C in the correct orientation to move along the cap pathway CP by extending into the mouths M of the caps C. The lobes 56 permit the caps C to move along the cap pathway CP because of a clearance 58 (FIG. 5) between the tips of each lobe and a plane defined by the second track surfaces 42 of the rails 36 (when the respective tips are closest to the plane). The plane defines the limit for how far the caps C can move away from the cap orientation detector 50 when the caps are moving along the cap pathway CP. The clearance 58 is greater than the thickness T of a top wall W of the caps C (broadly, a dimension from the top of the cap to the base of the mouth M of the cap). The top wall W defines the base of the mouth M of the cap C. Thus, the clearance 58 permits the cap C to move along the cap pathway without the lobe 56 binding against the top wall W (broadly, without jamming the caps in the cap track 30). However, the lobes 56 are configured to jam the caps C in the wrong orientation in the cap track 30. The lobes 56 prevent the caps C in the wrong orientation from moving along the cap pathway CP by contacting the top walls W of the caps C. As a result, the cap orientation detector 50 jams the cap C against the second track surfaces 42 of the rails 36. The lobe 56 engaging the top wall W of the cap C applies a force generally normal to the top wall (e.g., generally perpendicular to the cap pathway CP) to jam the cap against the cap track 30. This is the only force applied by the cap orientation detector 50 to the cap C in the wrong orientation. This inhibits the cap orientation detector 50 from rotating, and thereby stops the cap C in the wrong orientation from moving past the cap orientation detector. The clearance 58 is less than a height H of the caps C. This ensures that each lobe 56 will contact the top wall W of the cap and jam the cap in the cap track 30 when the cap is in the wrong orientation. Preferably, the clearance 58 is closer to the thickness T of the top wall W than to the height H of the cap C to ensure the cap C is not able to inadvertently squeeze between the cap orientation detector 50 and the plane when the cap is in the wrong orientation. In an example embodiment, multiple correctly oriented caps passing the cap orientation detector 50 may provide motive force to the cap orientation detector 50 such that each cap may not contact a lobe 56, but each cap will have its orientation detected by the cap orientation detector 50. As the cap orientation detector 50 is unpowered in an example embodiment, the motion of the caps in the cap pathway powers the rotational movement of the cap orientation detector 50. The side walls of a correctly orientated cap C will contact the free end of a single cantilevered lobe 56 which will rotate C will rotate the freely mounted cap orientation detector.

Figure 8:
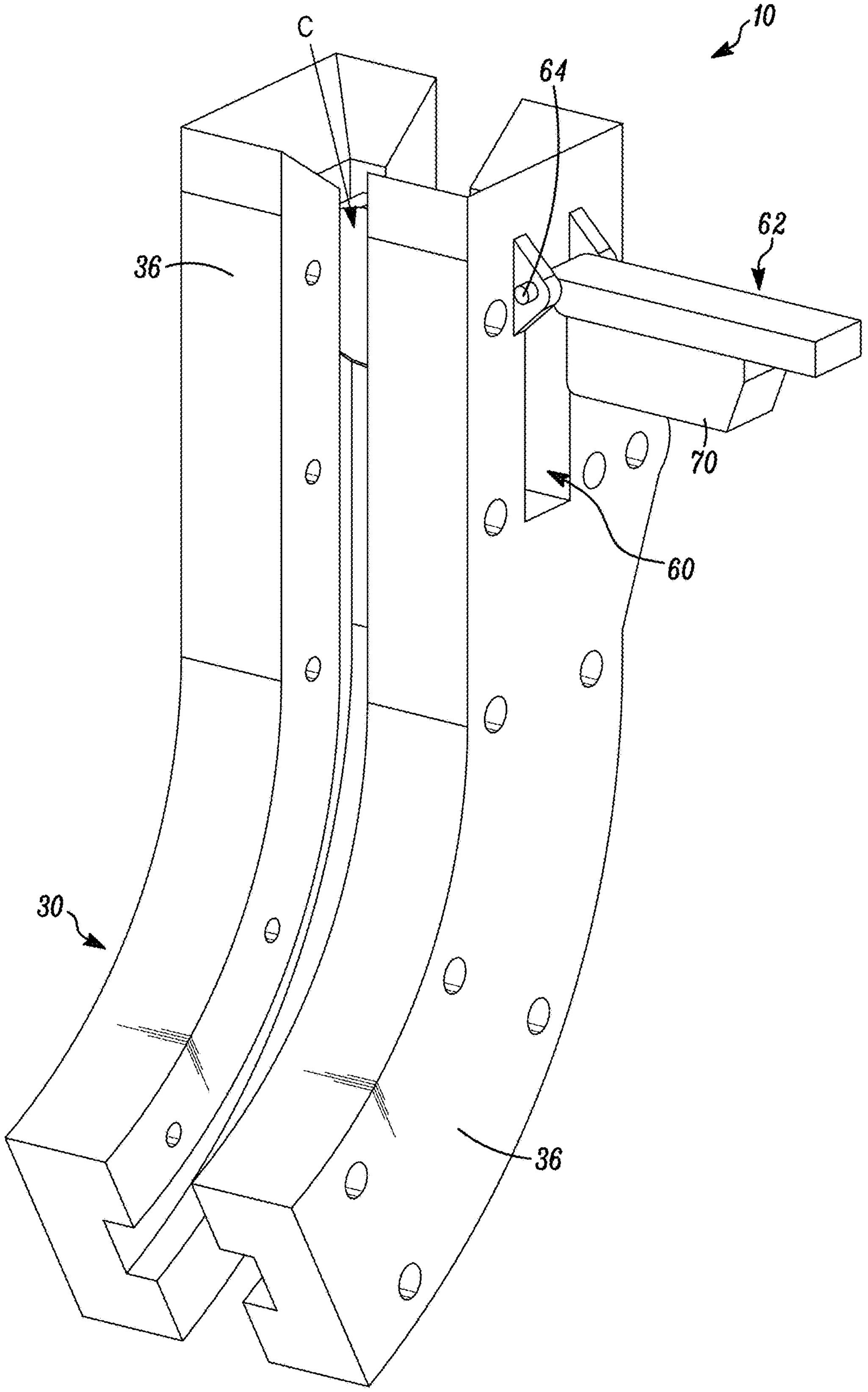
FIG. 8 is a perspective of the cap feeder, with a cap door opened.
Figure 9:
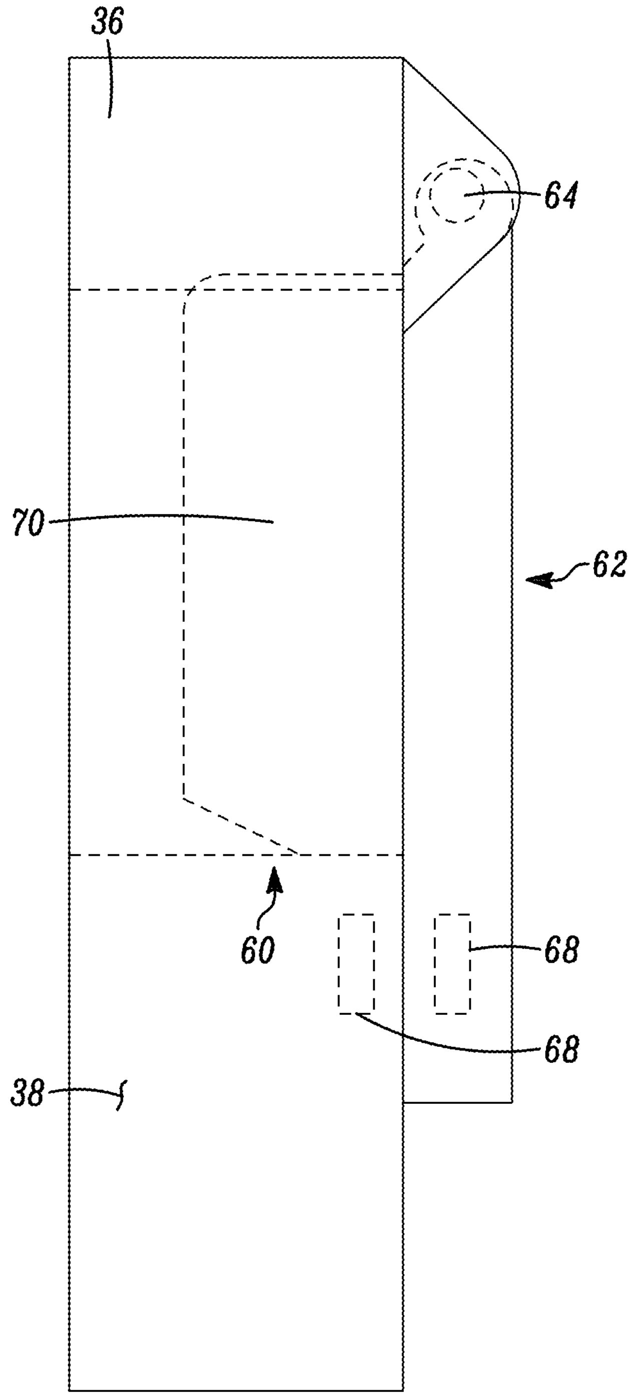
FIG. 9 is an enlarged illustration of the cap door.
Figure 10:
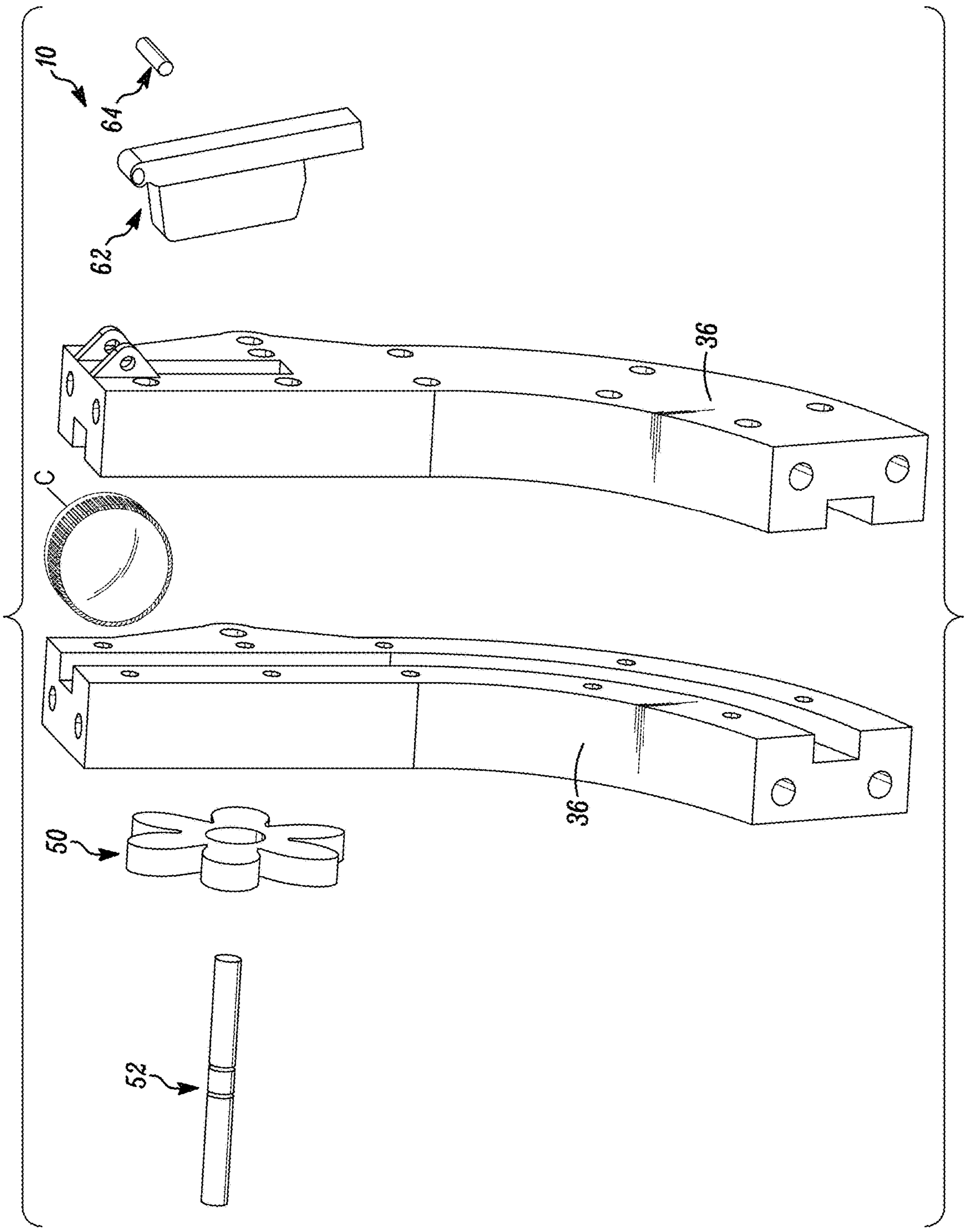
FIG. 10 is an exploded view of the cap feeder.
Figure 11:
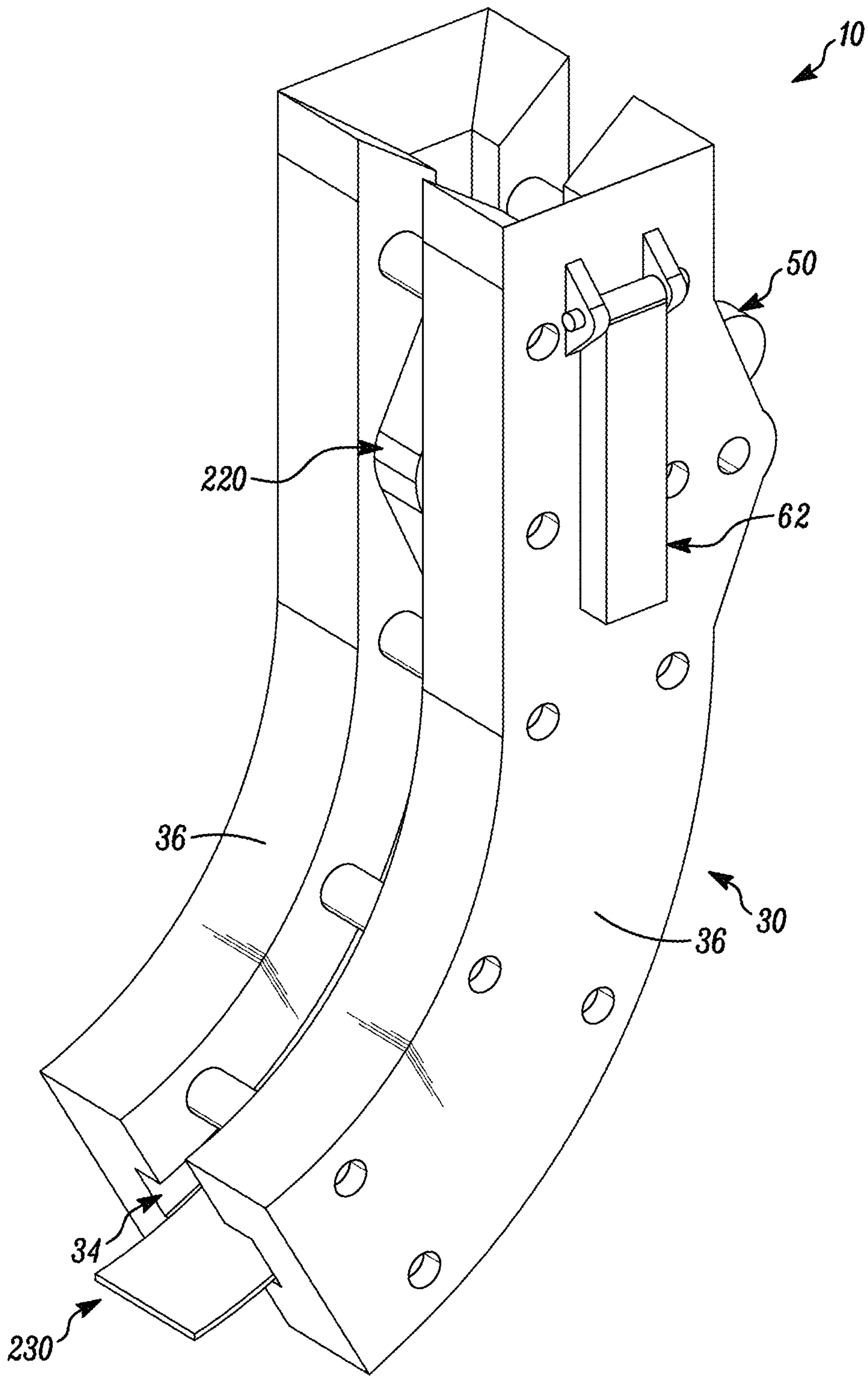
FIG. 11 is a perspective of the cap feeder with a detector cap guide and an alignment cap guide.

Referring to FIGS. 8 and 9, the cap track 30 includes a cap opening 60. The cap opening 60 allows a cap C in the wrong orientation to be expelled from the cap track 30 (e.g., taken out of the cap pathway CP). The cap opening 60 is sized and shaped to permit the cap C to pass through the cap opening. The cap opening 60 is disposed along the side of the cap pathway CP. The cap opening 60 is positioned along the cap pathway CP to be generally aligned with the position of a cap C in the wrong orientation jammed by the cap orientation detector 50 along the cap track 30. The cap opening 60 is proximate to the cap orientation detector 50 and is arranged to allow a cap C in the wrong orientation to leave the cap pathway CP. In the illustrated embodiment, the cap opening 60 is defined by one of the rails 36. The cap opening 60 extends from the groove 36 of the rail 36 to an exterior of the rail. Preferably, the cap track 30 includes a cap door 62 configured to close the cap opening 60. The cap door 62 is moveable between a closed position (FIG. 9) where the cap door closes or blocks the cap opening 60 and an open position (FIG. 8) where the cap door opens or does not block the cap opening. Preferably, the cap door 62 is biased toward the closed position. This results in the cap door 62 automatically closing the cap opening 60 in the event an operator forgets to the close the cap door. In the illustrated embodiment, the cap door 60 rotates, outswings, or turns about a pivot pin 64 adjacent the upper end of the cap door 62. This results in the weight of the cap door 62 biasing the cap door toward the closed position, although other ways of biasing the cap door, such as with a spring, are within the scope of the present disclosure. A closure 66 is provided to hold the cap door 62 in the closed position. In the illustrated embodiment, the closure 66 comprises a magnetic closure. The magnetic closure includes two magnets 68, one supported by the cap door 62 and the other supported by the rail 36, arranged to attract one another. Other types of closures, such as snaps, straps, fasteners, etc., are within the scope of the present disclosure. Preferably, the cap door 62 includes a plug 70. The plug 70 is sized, shaped, and arranged to be disposed in the cap opening 60 when the cap door 62 is in the closed position. The end surface 72 of the plug 70 is generally aligned and flush with the base of the groove 68 (from which the cap opening 60 extends). The plug 70 prevents the caps C from inadvertently moving into the cap opening 60 and/or preventing the caps from caught by the cap opening and blocking the flow of caps along the cap pathway CP. In the illustrated embodiment, the rail 36 opposite the rail having the cap opening 60 includes an access opening 74 (FIG. 4). The access opening 74 is generally aligned with the cap opening 60. The access opening 74 permits the operator to move a cap C out of the cap track 30, via the cap opening 60. The access opening 74 is generally opposite the cap opening 60, cap door 62, and aligned with wrongly oriented cap C. The access opening 74 is sized and shaped to allow the operator to insert a manual push rod herein to force the cap C into and through the cap opening 60 to remove the cap from the cap track 30. This allows the operator to expel a cap C in the wrong orientation from the cap track 30. Preferably, the magnetic force of the magnetic closure is easily overcome by a manual force, such as the force the operator imparts on the cap C by inserting one or more fingers through the access opening 74 and pushing the cap. This way, by pushing the cap C, the cap door 62 will automatically open and allow cap C to be expelled. The cap C will free fall once expelled out of cap opening 60 into a basket below to catch the cap C. The caps C that are expelled out of cap opening 60 will then be inspected. If there is any damage to the cap C it will be discarded. If the cap C is undamaged, it will be recirculated into the cap C hopper or bin that holds the plurality of caps C. In one embodiment, the cap feeder 10 may include a chute (not shown) arranged to receive the caps C from the cap opening 60. The chute can lead to the hopper of the capping system 12, thereby putting the caps back into circulation so the caps can be picked up again by the cap elevator (in the correct orientation this time).

The operation of the capping system 12, and the cap feeder 10, will now be described. The cap elevator 14 is lifts caps C out of the hopper. As mentioned above, the cap elevator 14 is preferably configured to generally only pick up caps C in the correct orientation. However, the cap elevator 14 may still pick up a small percentage of caps C in the wrong orientation. The cap elevator 14 transports the caps C upward, where they are directed into the elevated guide section 20 of the cap conveyor 18. The elevated guide section 20 guides the caps C to the cap feeder 10. The caps C enter the cap feeder 10 and begin to move along the cap pathway CP defined thereby. The caps C come into contact with the cap orientation detector 50. Because the cap orientation detector 50 is freely rotatable about the axis of rotation, when a cap C contacts the cap orientation detector, the cap rotates the cap orientation detector. In other words, the weight of a single cap C is able to rotate the cap orientation detector. In the illustrated embodiment, the cap orientation detector 50 is positioned along a straight, vertical section of the cap pathway CP. This generally maximizes the force of gravity on the cap C when the cap comes into contact with the cap orientation detector 50 to rotate the cap orientation detector. However, in other embodiments, the cap orientation detector 50 may be positioned along a section of the cap pathway of other configurations, such as a straight section at an angle the vertical (and the horizontal) or an arcuate section (such that one that transitions from more vertical to more horizontal).

The cap C contacts one of the lobes 56 (referred to as a leading lobe) to rotate the cap orientation detector 50. A lobe 56 will enter the mouth M of a cap C if it is in the correct orientation. As the cap orientation detector 50 rotates around its axis of rotation, the cap C will be allowed to continue along the cap pathway CP. The subsequent lobe 56 will remain in the mouth M of the cap C until the cap passes the cap orientation detector 50. The cap C then continues along the cap pathway CP. A cap C in the correct orientation will then move out of the cap feeder 10, into the capper section 22 of the cap conveyor 18 and toward the capper 16. A lobe will be unable to enter the mouth M of a cap C if it is in the wrong orientation. The lobe will contact the wall W of the cap C, blocking the cap C from continuing along the cap pathway CP. In another embodiment the mouth M of the cap C is deformed. After the cap C in the wrong orientation is jammed by the cap orientation detector 50, the operator opens the cap door 62 and removes the cap C from the cap track 30. The operator inserts one or more fingers through the access opening 74 to push the cap C in the wrong orientation through the cap opening 60. In another embodiment (FIG. 17) the cap C is expelled through access opening 74 by cap ejector 202. The next cap C can then move along the cap pathway CP into contact with the cap orientation detector 50 to repeat the process.

Figure 19:
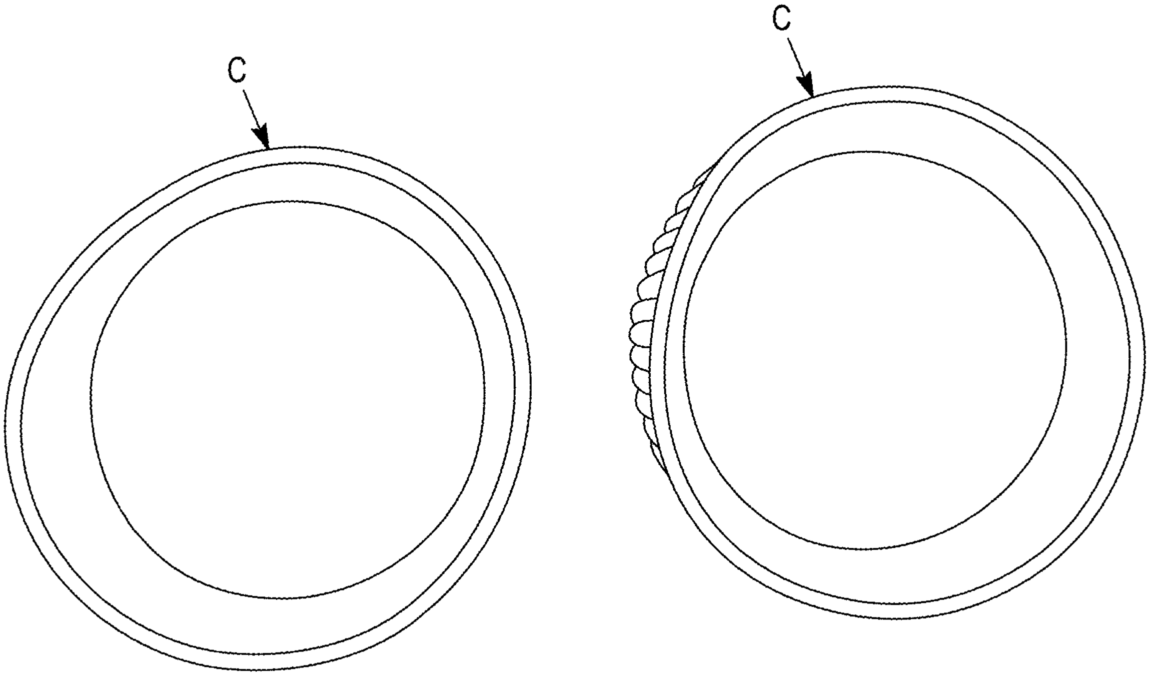
FIG. 19 is a plan view of deformed caps.

The cap orientation detector may also detect when a cap C is deformed or warped. Examples of deformed/warped caps C are shown in FIG. 19. As a result of deformation, these caps C do not have perfectly circular shapes (e.g., perfectly circular mouths) and therefore can be caught by the lobes 56 of the cap orientation detector 50. In other words, because the mouths M of these deformed caps C are no longer circular or symmetrical, the lobes 56 may become jammed with the caps when the lobes enter the non-circular mouths M. Thus, in addition to detecting the orientation of the caps C, the cap orientation detector 50 may also detect whether or not a cap is deformed. In this manner, the cap orientation detector 50 may also be considered as a cap deformation detector. To better detect when a cap C is deformed, in one embodiment, the width $W_1$ of each lobe 56 (specifically, the width of the portion of each lobe that enters the mouths of the caps) may be closer to the diameter of the mouth M (non-deformed diameter) of the cap C. For example, the width $W_1$ of each lobe 56 may be about 60% of the diameter of the mouth, or about 70% of the diameter of the mouth, or about 75% of the diameter of the mouth, or about 80% of the diameter of the mouth, or about 90% of the diameter of the mouth. The cap orientation detector 50 is arranged along the centerline of the cap pathway CP (e.g., the centerline intersects the lobes 56 when the lobes are in the cap pathway). The centerline of the cap pathway CP corresponds generally to a line of centers of the procession of the caps C. This ensure that the lobes 56 of the cap orientation detector will generally extend through the center of the mouths M of the caps C, which allows the lobes 56 to better detect if a cap is deformed.

In one embodiment, the cap feeder 10 includes a set of cap orientation detectors 50, each having different sized lobes 56 for different sizes of caps C. The cap orientation detectors 50 of the set can each be removeably mount on the shaft 52, to change out the detectors and configured the cap feeder 10 for different sizes of caps C. The position of the cap orientation detector 50 (specifically, the axis of rotation of the cap orientation detector 50) may also be selectively positionable relative to the cap pathway. In one embodiment, the shaft 52 is selectively positionable relative to the cap pathway CP to match the position of the shaft with the size of cap orientation detector mounted thereon. For example, the cap track 30 may include various pairs of shaft openings, at different distances from the cap pathway CP. The operator can then select the pair of shaft openings to mount the shaft 52 in that corresponds to the selected size of cap orientation detector. In another example, the cap track 30 may include a pair of elongate slots, with the operator selectively positioning the shaft in the elongate slots to set the distance between the axis of rotation and the cap pathway CP based on the selected size of cap orientation detector. Other ways of selectively positioning the cap orientation detector 50 relative to the cap pathway CP are within the scope of the present disclosure.

Figure 12:
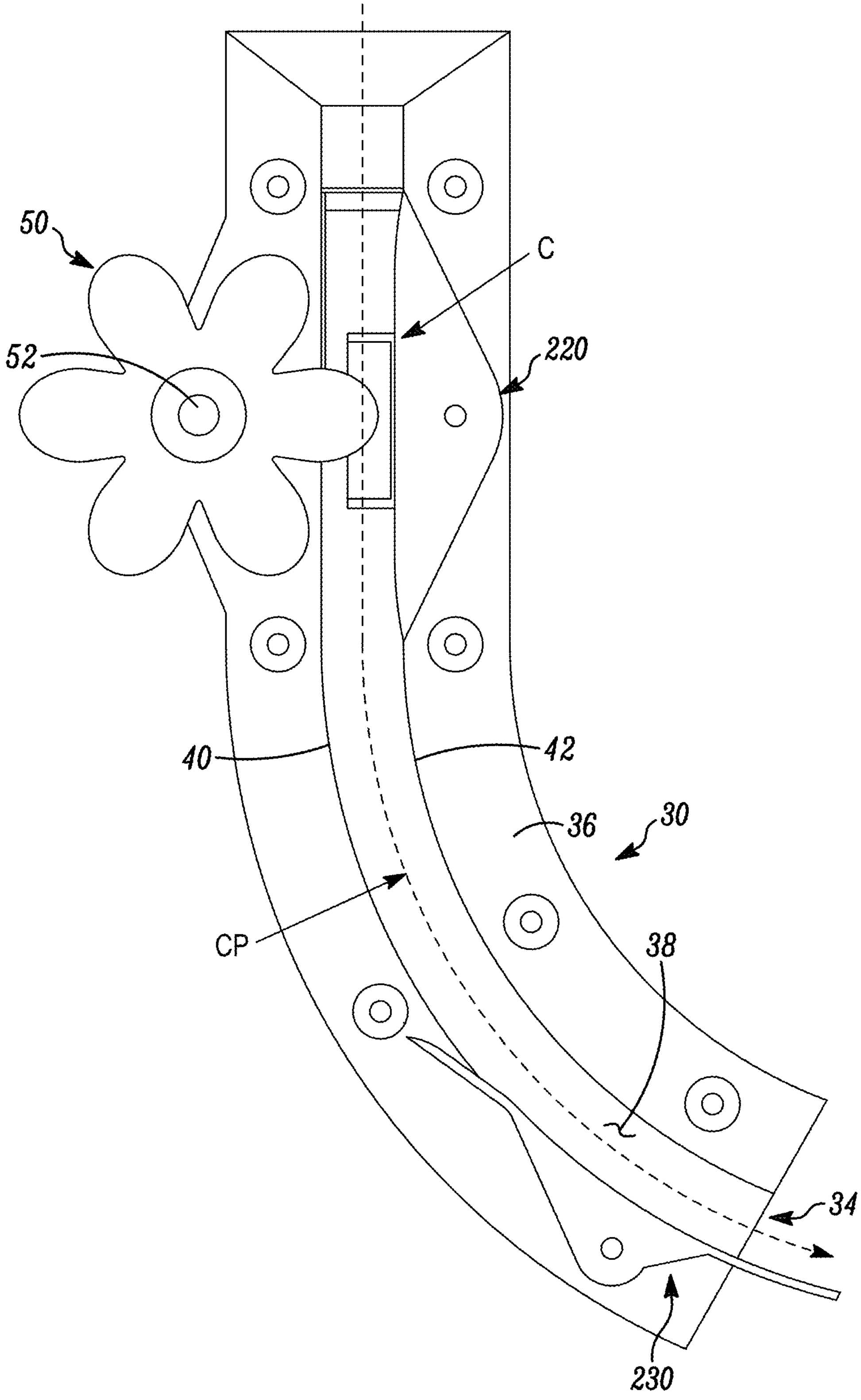
FIG. 12 is a cross-section of the cap feeder of FIG. 11.
Figure 13:
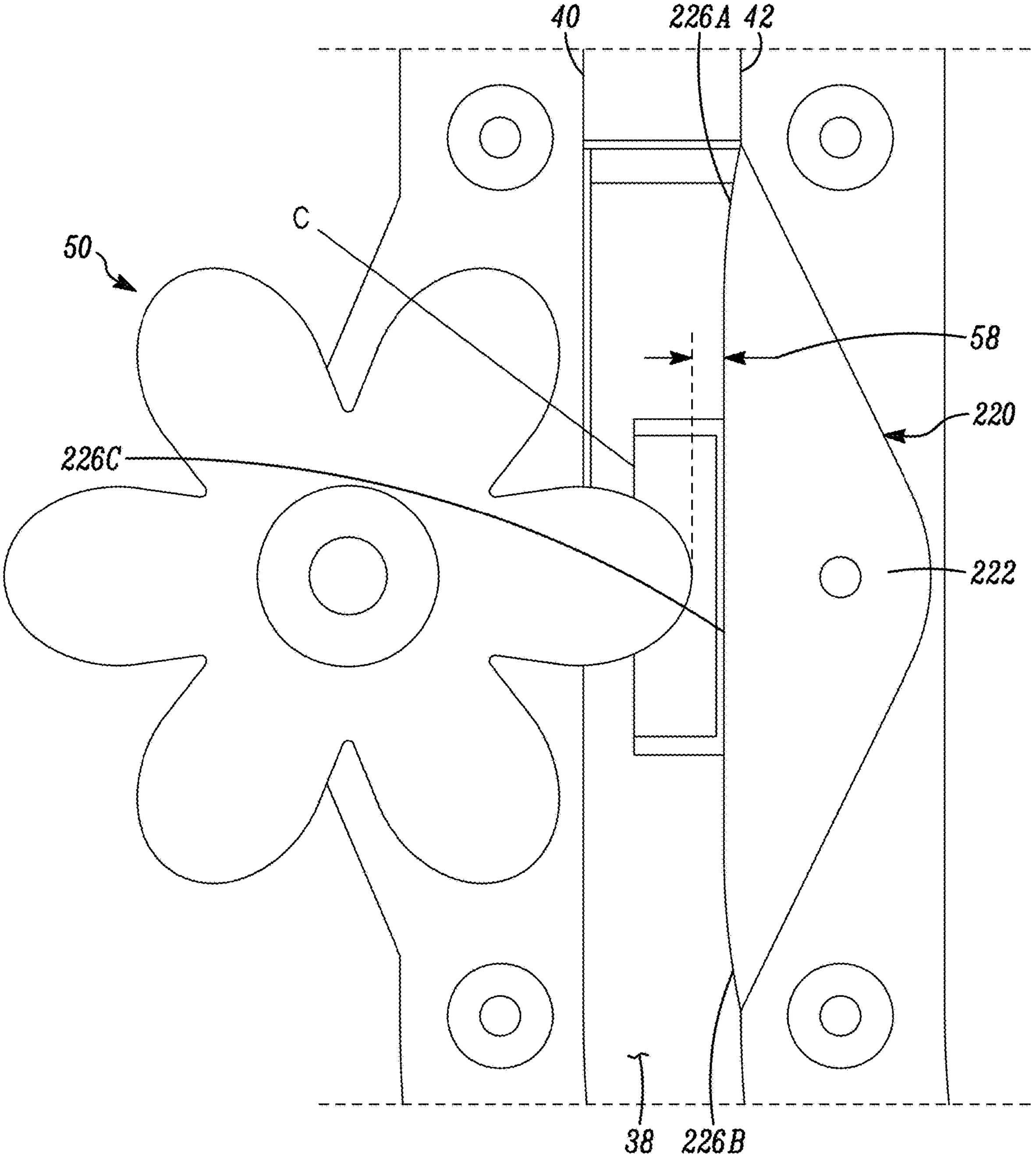
FIG. 13 is an enlarged cross-section of the cap feeder of FIG. 11.

Referring to FIGS. 11-16B, in one embodiment, the cap feeder 10 includes at least one cap guide configured to reduce at least one dimension (e.g., thickness) of the cap pathway CP to conform the cap pathway to different sizes of caps C. As shown in FIGS. 18A-B, caps C come in different sizes (e.g., heights). The top wall W along with the annular wall make the defined space of the mouth M. For example, FIG. 18A illustrates a one size of cap C (e.g., a safety cap) and FIG. 18B illustrates another size of cap C (e.g., a non-safety cap). As shown, the height H of the safety cap C (FIG. 18A) is greater than the height H of the non-safety cap C (FIG. 18B) and the thickness T of the top wall W of the safety cap is greater than the thickness T of the top wall W of the non-safety cap. For reference, the caps C shown in FIGS. 2-5, 7A-8, 10, 17, and 19 are safety caps. The caps C shown in FIGS. 12 and 13 are non-safety caps. The smaller size caps C (e.g., the non-safety caps) flow more easily through the cap track 30 than they would without the one or more cap guides. The grooves 38 of the cap track 30 are sized to receive the larger size cap C (e.g., the safety cap). As a result, when the smaller size caps C move along the cap pathway CP, the orientation of the smaller size caps can become warped or skewed within the grooves 38 which can potentially cause the smaller size caps to become jammed in the grooves, especially when being contacted by the cap orientation detector 50. By reducing the size (e.g., thickness) of the cap pathway CP, the cap guides reduce the ability for the orientation of smaller size caps to become skewed and thereby reduce the likelihood that the smaller size caps jam up in the cap track 30. It is understood the cap guides are optional and that the cap feeder can supply the smaller size caps C without using the cap guides.

In the illustrated embodiment, one of the cap guides includes a detector cap guide 220. The detector cap guide 220 is configured to be disposed adjacent the cap orientation detector. The detector cap guide 220 is supported by the cap track 30. The detector cap guide 220 includes a mount or base 222 configured to be attached to the cap track 30. In the illustrated embodiment, the mount 222 includes a fastener opening sized and shaped to receive a fastener (e.g., bolt, screw, etc.) that attaches the two rails 36 together. When coupled to the cap track 30, the mount 222 of the detector cap guide 220 is disposed in the channel 44 between the two rails 36. The detector cap guide 220 includes a guide member or flange 224 attached (e.g., joined) to the mount 222. The guide flange 224 is sized, shaped, and arranged to extend into each groove 38 of the two rails 36 when the detector cap guide 220 is mounted to the cap track 30. The width of the guide flange 224 is generally equal to or slightly less than the width of the cap pathway CP. The guide flange 224 (e.g., one or more surfaces thereof) is in face-to-face engagement with the second track surfaces 42 of the rails 36. The guide flange 224 reduces the thickness of the cap pathway CP. The caps C travel along the guide flange 224 as the caps move along the cap pathway CP, past the cap orientation detector. The guide flange 224 includes a cap guide surface 226. When the detector cap guide 220 is attached to the cap track 30, the cap guide surface 226 is disposed along the cap pathway CP opposite the cap orientation detector 50. In other words, the cap guide surface 226 faces the cap orientation detector 50. The cap guide surface 226 is arranged such that the caps C move along the cap guide surface as the caps move past the cap orientation detector 50.

Figure 14A:
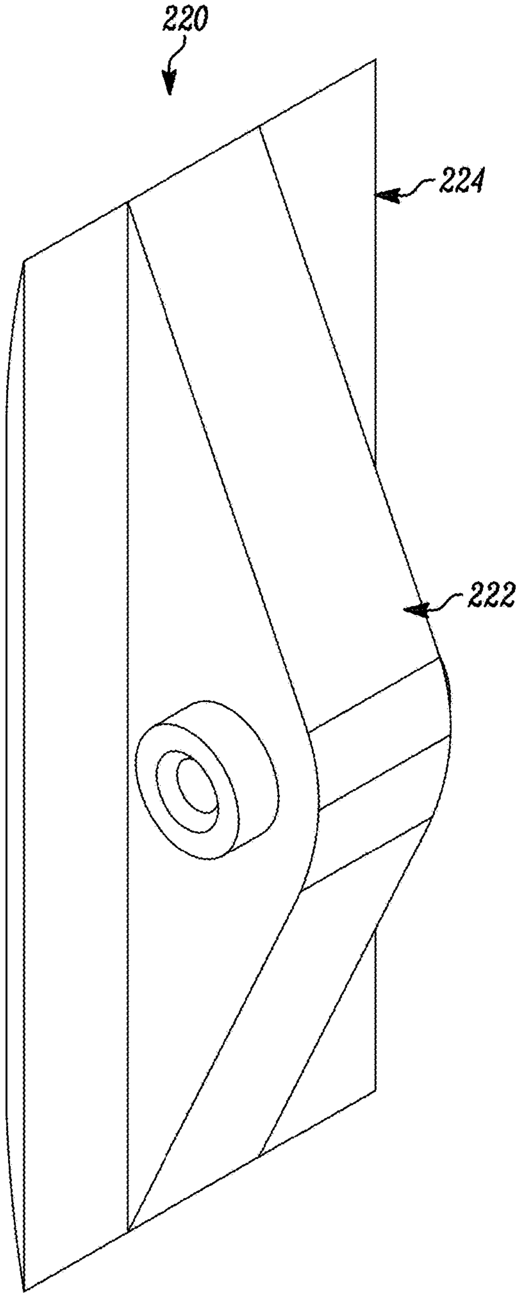
FIGS. 14A-B are perspectives of the detector cap guide.
Figure 14B:
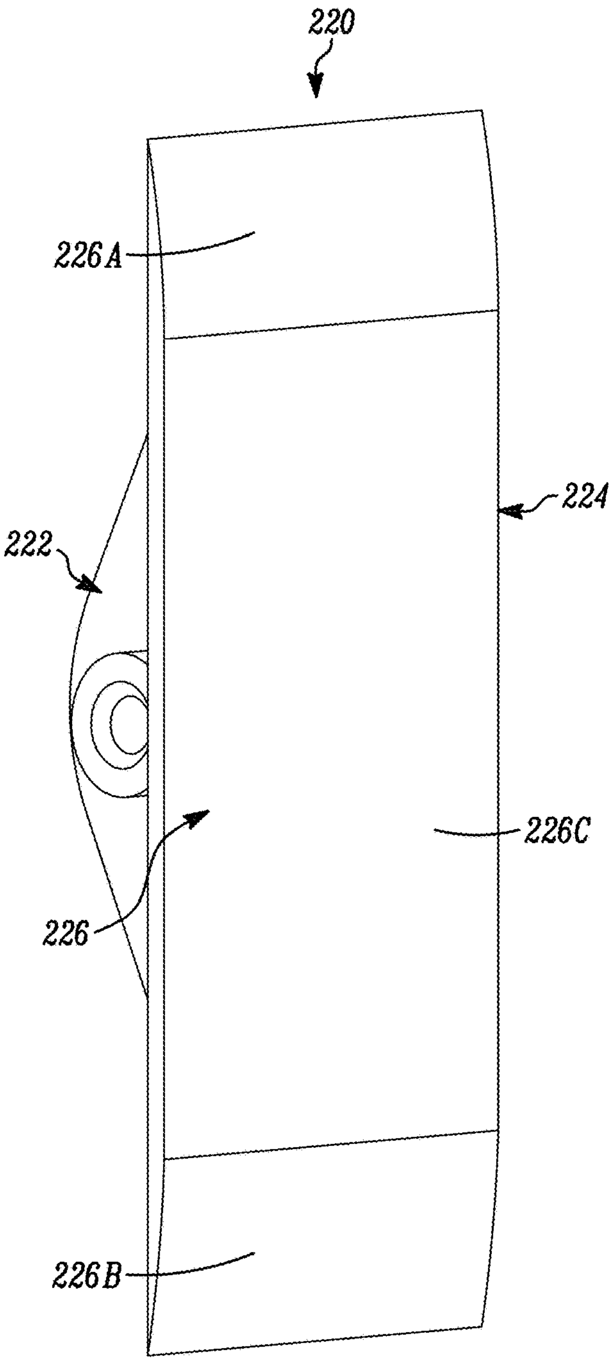
Figure 15:
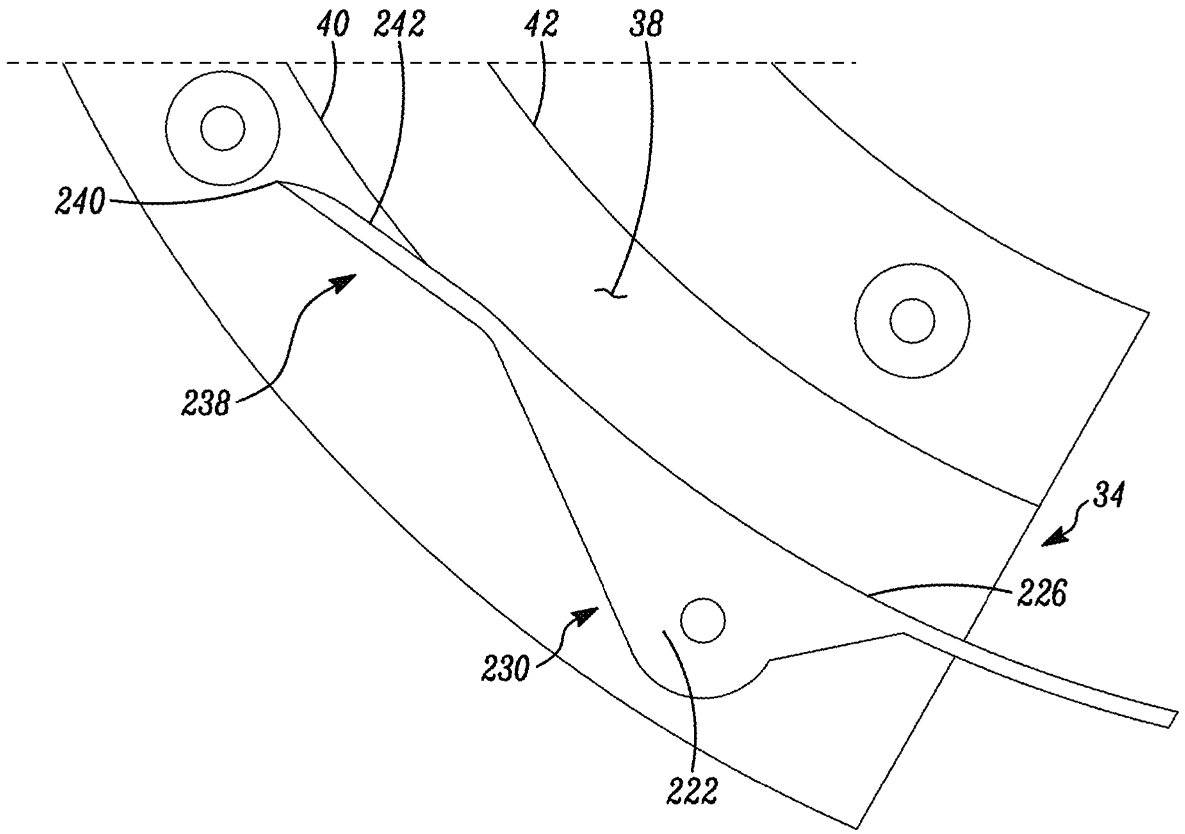
FIG. 15 is an enlarged cross-section of the cap feeder of FIG. 11.
Figure 16A:
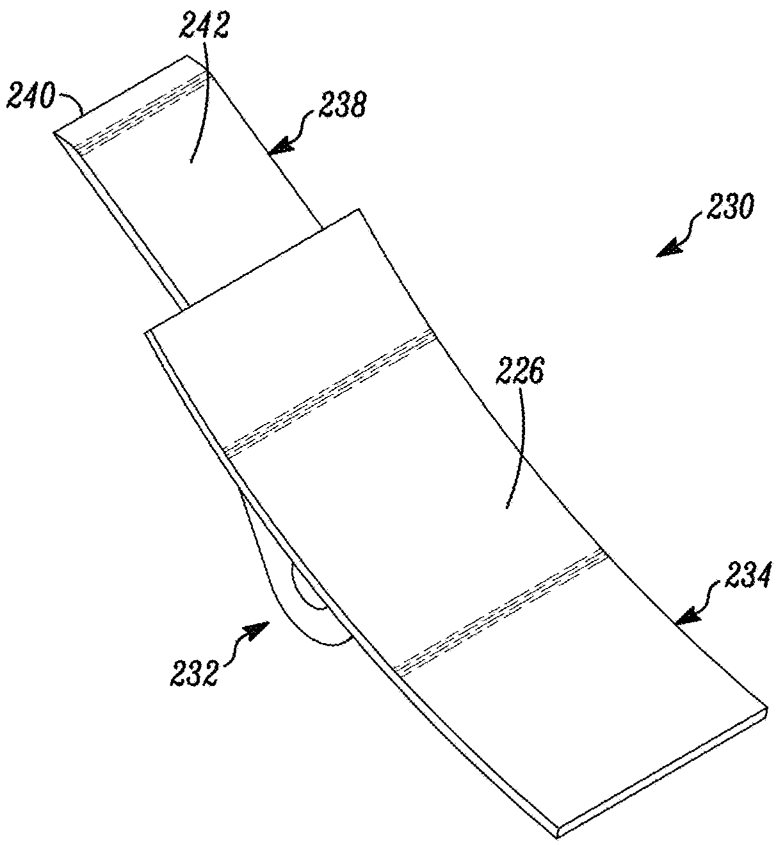
FIGS. 16A-B are perspectives of the alignment cap guide.
Figure 16B:
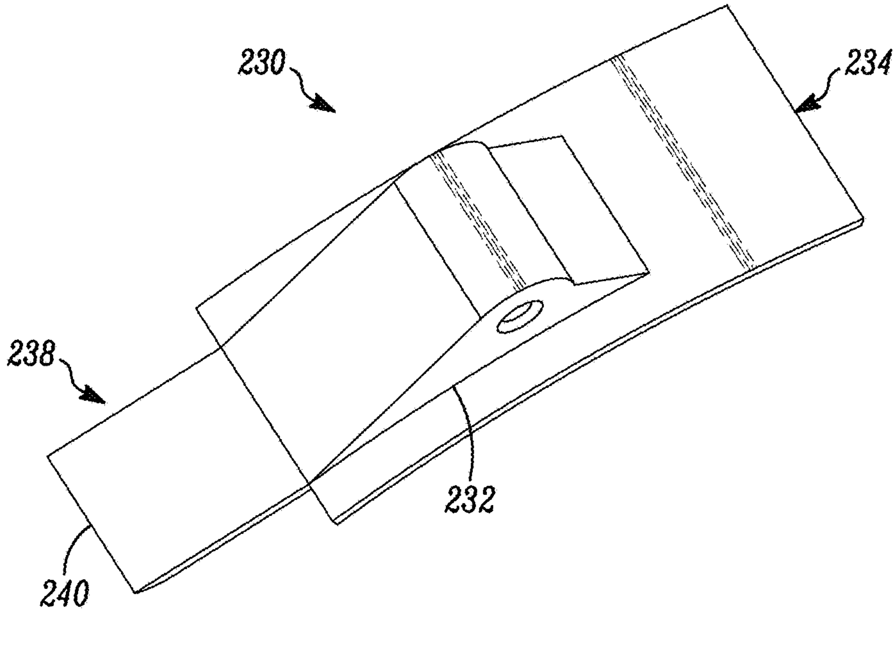

In the illustrated embodiment, the cap guide surface 226 includes opposite upstream and downstream end sections 226A, 226B and a middle or intermediate section 226C. The intermediate section 226C of the cap guide surface 226 is generally planar, faces the cap orientation detector 50, and is generally parallel to the track surfaces 40, 42. Generally, the intermediate section 226C corresponds or matches the shape of the portion of second track surfaces 42 the intermediate section replaces. As shown in FIG. 13, the caps C ride or slide along the intermediate section 226C when engaging and moving past the cap orientation detector 50. As shown in FIG. 14, the intermediate section 226C of the cap guide surface 226 is proud of or offset from the second track surfaces 42 (in the direction toward the first track surfaces 40). Thus, as a result of the guide flange 224 reducing the thickness of the cap pathway CP, the clearance 58 that permits the caps C in the correct orientation to continue moving past the cap orientation detector 50 is reduced to better conform the cap pathway (e.g., a portion thereof) to the smaller size caps. In this case, the clearance 58 is between the tips of each lobe 56 of the cap orientation detector 50 and the intermediate section 226C. The clearance 58, in this case, is still greater than the thickness T of the top wall W of the smaller size caps C to permit the smaller size caps to move along the cap pathway without a lobe 56 binding against the top wall of the smaller size cap when the smaller size caps are in the correct orientation but the clearance is still less than the height H of the smaller size caps to ensure that each lobe 56 will contact the top wall W of the smaller size cap C and jam the smaller size cap in the cap track 30 when the smaller size cap is in the wrong orientation. The upstream and downstream end sections 226A, 226B provide a smooth transition between the second track surfaces 42 and the intermediate section 226C. The smooth transition eliminates any exposed edges which could potentially catch a cap and stop the cap from continuing to move along the cap pathway CP. The end section 226A, 226B are each ramped or beveled. As the caps C move along the cap pathway CP, the upstream end section 226A provides a smooth transition from the second track surfaces 42 to the intermediate section 226C of the cap guide surface 226 and the downstream end section 226B provides a smooth transition from the intermediate section back to the second track surfaces.

In the illustrated embodiment, one of the cap guides includes an alignment or outlet cap guide 230. The alignment cap guide 230 is configured to be disposed along the cap pathway CP at the cap outlet 34 of the cap track 30 and is arranged to guide the caps C as the caps move through the cap outlet. The alignment cap guide 230 is supported by the cap track 30. The alignment cap guide 230 includes a mount or base 232 configured to be attached to the cap track 30. In the illustrated embodiment, the mount 232 includes a fastener opening sized and shaped to receive a fastener (e.g., bolt, screw, etc.) that attaches the two rails 36 together. When coupled to the cap track 30, the mount 232 of the alignment cap guide 230 is disposed in the channel 44 between the two rails 36. The alignment cap guide 230 includes a guide member or flange 234 attached (e.g., joined) to the mount 232. The guide flange 234 is sized, shaped, and arranged to extend into each groove 38 of the two rails 36 when the alignment cap guide 230 is mounted to the cap track 30. The width of the guide flange 234 is generally equal to or slightly less than the width of the cap pathway CP. The guide flange 234 (e.g., one or more surfaces thereof) is in face-to-face engagement or abuts with the first track surfaces 40 of the rails 36. The guide flange 234 reduces the thickness of the cap pathway CP. The caps C travel along the guide flange 234 as the caps move along the cap pathway CP, out of the cap outlet 34 and into capper section 22 (broadly, any downstream component). The guide flange 234 starts in the cap track 30 and extends out from the cap outlet 34. The guide flange 234 includes a cap guide surface 236. The cap guide surface 236 generally corresponds or matches the shape of the portion of first track surfaces 40 the cap guide surface replaces. For example, the gap guide surface 236 is arcuate or curved to match the arcuate shape of the track surfaces 40, 42. The cap guide surface 236 is proud of or offset from the first track surfaces 40 (in the direction toward the second track surfaces 42). The cap guide surface 236 guides the caps C as the cap move out of the cap outlet 34 and into the capper section 22. The caps C slide on the cap guide surface as the caps move out of the cap outlet. This prevents any misalignment between the cap feeder 10 and the capper section 22 from preventing the caps C from moving out of the cap feeder and into the capper section. For example, a slight misalignment between the cap feeder 10 and capper section 22 could otherwise expose one or more edges which could potentially catch a cap and stop the cap from continuing to move. By extending out of the cap outlet 34 and into the capper section 22, the cap guide surface 236 (broadly, the cap flange 234) prevents the caps from catching on any exposed edges at the interface between the cap feeder 10 and the capper section 22.

The alignment cap guide 230 may also include a guide tongue or ramp 238. The guide tongue 238 is arranged to provide a smooth transition between the first track surfaces 40 and the cap guide surface 236 of the alignment cap guide 230. The guide tongue 238 extends generally upstream from the guide flange 234. The guide tongue 238 is sized and shaped to fit within the channel 44 between the two rails 36. The guide tongue 238 includes a tip or edge 240 that is disposed in the channel 44. In other words, the tip 240 of the guide tongue 238 is offset from the first guide surfaces 40 in a direction away from the second guide surfaces 42. The guide tongue 238 includes a transition guide surface 242. The transition guide surface 242 is arranged to contact the caps C as the caps move along the cap pathway CP and provide a smooth transition between the first track surfaces 40 and the cap guide surface 236. In the illustrated embodiment, the transition guide surface 236 is arcuate or curved, although it may be planar in other embodiments. The curved of the transition guide surface 242 is opposite the curve of the first track surfaces 40. The transition guide surface 142 starts at the tip 240 of the guide tongue 238 and extends to and is flush with the cap guide surface 236. As result, the transition guide surface 242 starts out of the cap pathway CP and gradually enters the cap pathway as the transition guide surface extends toward the guide flange 234. This results in the caps coming into contact with the guide tongue 238 and sliding along the transition guide surface 242 as the caps move along the cap pathway CP, thereby gradually and smoothly transitioning the caps C from the first track surfaces 40 to the cap guide surface 236. The prevents the caps C from being caught on any exposed edges (such as the upstream edge of the guide flange 234) and stop moving along the cap pathway. In some embodiments, the alignment cap guide 230 may also include a guide tongue on the downstream end to provide a smooth transition between the cap guide surface 236 and the surface(s) of the capper section 22. In some embodiment, the detector cap guide 220 may include a guide tongue on the upstream end to further provide a smooth transition from the second track surfaces 42 to the intermediate section 226C of the cap guide surface 2026 of the detector cap guide and/or a guide tongue on the downstream end to further provide a smooth transition from the intermediate section back to the second track surfaces.

Figure 17:
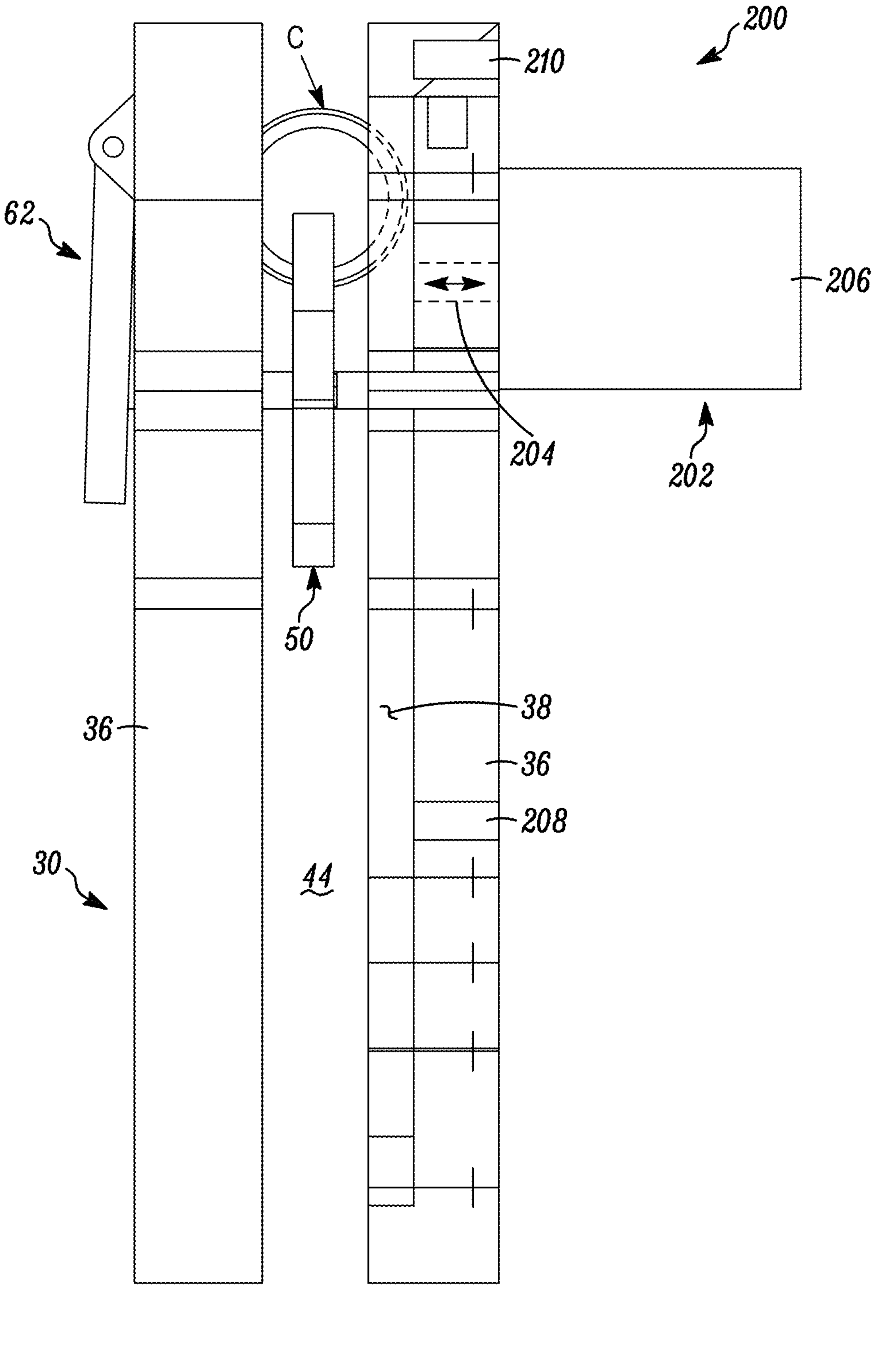
FIG. 17 is a rear view of a cap feeder according to another embodiment of the present disclosure, with one rail thereof shown transparent to show interior details.
Figure 18A:
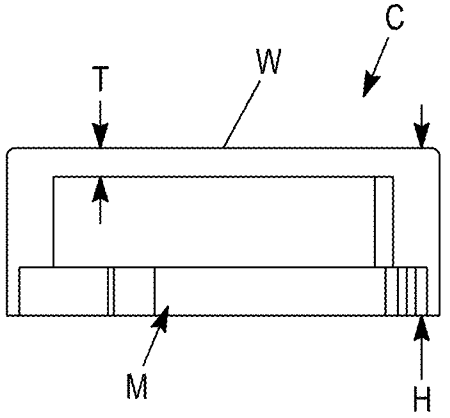
FIGS. 18A-B are cross-sections of different caps.
Figure 18B:
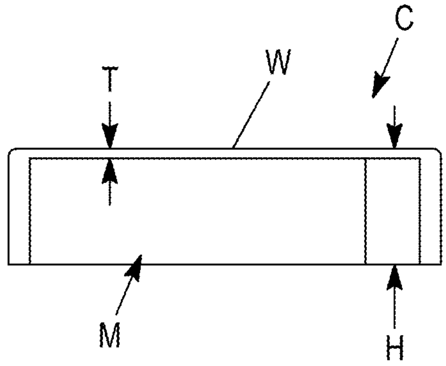

Referring to FIG. 17, another embodiment of a cap feeder according to the present disclosure is generally indicated by reference numeral 200. The cap feeder 200 of FIG. 17 is generally analogous to the cap feeder 10 of FIGS. 2-10 and, thus, for ease of description, were similar, analogous or identical parts are used, identical reference numerals are employed. Accordingly, unless clearly stated or indicated otherwise, the above descriptions regarding the cap feeder 10 of FIGS. 2-10 also apply to the cap feeder 200 of FIG. 17.

For example, the cap feeder 200 of FIG. 17 can be used in the capping system 12 (in place of the cap feeder 10 of FIGS. 2-10).

In this embodiment, the cap feeder 200 includes a cap ejector system configured to determine if the cap orientation detector 50 has stopped a cap C in the wrong orientation and to expel the wrongly oriented cap from the cap pathway CP. The cap ejector system includes a cap ejector 202 configured to eject a cap C from the cap pathway CP. For example, the cap ejector 202 can be used to remove a cap C that is in the wrong orientation from the cap track 30. The cap ejector 202 avoids manual removal of cap C by operator. In one embodiment, the cap ejector 202 includes a pusher 204, such as a push rod or any other suitable device, 36 arranged to force the cap C into and through the cap opening 60. The cap ejector 202 includes a prime mover 206, such as a motor (e.g., stepper motor), linear actuator, or any other suitable device. The prime mover 206 is operatively coupled to the pusher 204 to selectively move or extend the pusher from a home position (see FIG. 17) to expel a cap C through the cap opening 60. Pushing the cap C into and through the cap opening 60 will cause the cap door 62 to open, thereby allowing the cap to move through and out of the cap opening. After a wrongly oriented cap C is ejected, the primer mover 204 retreats or retracts the pusher 204 back to the home position. Once pusher 204 is in the home position, caps C in the correct orientation will be permitted to move past the cap ejector 202.

The cap feeder 200 may also include a first cap sensor 208 and a second cap sensor 210. The first and second cap sensors 208, 210 are part of the cap ejector system. The cap sensors 208, 210 may be any suitable sensor able to detect the presence and absence of a cap C. For example, the cap sensors 208, 210 may comprise a beam break sensor. The first cap sensor 208 is arranged to detect the presence of a cap C (in the cap pathway CP) at a location downstream of the cap orientation detector 50. In other words, the first cap sensor 208 is positioned along the cap pathway CP at a downstream location relative to the cap orientation detector 50. The second cap sensor 210 is arranged to detect the presence of a cap C (in the cap pathway CP) at a location at or upstream of the cap orientation detector 50. In other words, the second cap sensor 210 is positioned along the cap pathway CP at the location of the cap orientation detector 50 or at a location upstream of the cap orientation detector. The first and second cap sensors 208, 210 work together to determine when the cap orientation detector 50 has detected and trapped a cap in the wrong orientation (or a deformed cap). In operation, the caps C are arranged in a single file line along the cap pathway CP (see generally FIG. 1). Accordingly, if both the first and second cap sensors 208, 210 detect the presence of a cap C, then the cap orientation detector 50 has not stopped (or has just stopped) a cap in the wrong orientation. However, once the cap orientation detector 50 stops a cap C in the wrong orientation, the caps C up upstream of the cap orientation detector 50 will also be stopped but the caps downstream of the cap orientation detector will continue to move toward the capper 16. Thus, eventually, the second cap sensor 210 will detect the presence of a cap C (one of the caps in the line upstream of the cap orientation detector 50) while at the same time the first cap orientation sensor 208 will not detect the presence of a cap (because the caps have continued to move toward the capper 16). In this way, the first and second cap sensors 208, 210 are able to detect the presence of a cap C in the wrong orientation at the cap orientation detector.

The first and second sensors 208, 210 and the cap ejector 202 can be communicatively coupled to a cap feeder controller (not shown) (broadly, part of the cap ejector system). The cap feeder controller can receive signals from the first and second cap sensors 208, 210 indicative of if these sensors detect or do not detect the presence of a cap. Further, the cap feeder controller can operate the cap ejector 202 to remove a cap C. When the cap feeder controller receives signals indicating the first cap sensor 208 does not detect the presence of a cap C and the second cap sensor 210, at the same time, does detect the presence of a cap-thereby signaling a cap in the wrong orientation (or a deformed cap) has been stopped by the cap orientation detector, the cap feeder controller can operate the cap ejector 202 to eject the cap in the wrong orientation. The second cap sensor 210 may also be used to determine when the cap elevator 14 should be operated. For example, if the second cap sensor 210 does not detect the presence of a cap C, the cap elevator 14 can be turned on to supply additional caps to the cap feeder 200. Likewise, if the second cap sensor 210 does detect the presence of a cap C, the cap elevator 14 can be turned off to stop supplying additional caps to the cap feeder 200. In this embodiment, the cap feeder controller can be communicatively coupled to the cap elevator 16 and operate the cap elevator as needed based on the signals received by the second cap sensor 210.

Other ways of determining when the cap orientation detector 50 has stopped a cap C in the wrong orientation are within the scope of the present disclosure. For example, the cap feeder 200 can include a rotation sensor configured to determine when the cap orientation detector 50 is rotating. If the cap orientation detector 50 is not rotating (such as over a set period of time and/or when the capper 16 is operating), then it has stopped a cap in the wrong orientation.

As mentioned above, the cap feeders 10, 200 of the present disclosure may be implemented as part of a capping system or device 12, such as the capping device 138 described in the pharmacy below.

Figure 20:
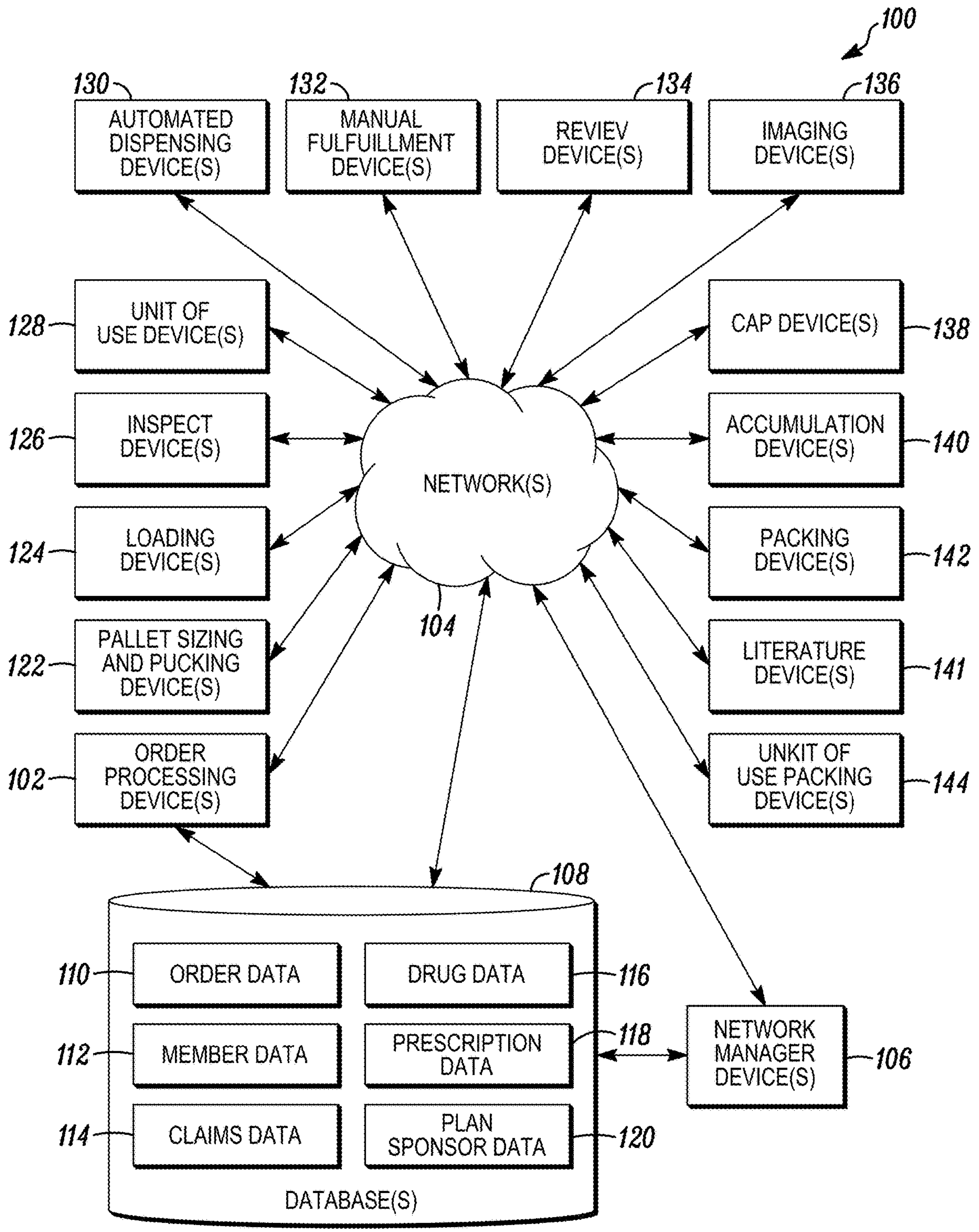
FIG. 20 is a block diagram of an example pharmacy.

Referring to FIG. 20, example systems and methods for automated pharmaceutical dispensing will now be described. In the following description, for purposes of explanation, numerous specific details are set forth in order to provide a thorough understanding of example embodiments. It will be evident, however, to one of ordinary skill in the art that these embodiments may be practiced without these specific details.

Generally, a prescription order is generated for a high-volume pharmacy. The prescription order may include more than one prescription drug for fulfillment. Each prescription drug in a prescription order is an order component of the prescription order. Generally, the order components are pill bottles or other containers and packaging having a measured quantity of a prescription drug therein. These containers may be filled by a mostly manual process, through a semiautomatic process, or a more fully automated process. Various factors may affect the availability of filling drugs through these processes in a pharmacy. A more fully automated process may be employed in a mail order pharmacy to fill containers with most frequently used drugs.

FIG. 20 is a block diagram of an example system 100, according to an example embodiment. While the system 100 is generally described as being deployed in a high-volume pharmacy (e.g., a mail order pharmacy, a direct delivery pharmacy, an automated pharmacy, and the like), the system 100 may otherwise be deployed. The system 100 may include an order processing device 102 in communication with a benefit manager device 106 over a network 104. In an example embodiment, the order processing device 102 may implement functions described in U.S. patent application Ser. No. 12/874,107, which is hereby incorporated by reference, to move a patient to a high-volume pharmacy. Additional devices which may be in communication with the benefit manager device 106 and/or the order processing device 102 over network 104 include: database(s) 108 which may store one or more than one of order data 110, member data 112, claims data 114, drug data 116, prescription data 118, and plan sponsor data 120; pallet sizing and pucking device(s) 122; loading device(s) 124; inspect device(s) 126; unit of use device(s) 128; automated dispensing device(s) 130 (an automated dispensing device may include a capper as described herein); manual fulfillment device(s) 132; review device(s) 134; imaging device(s) 136; cap device(s) 138; accumulation device(s) 140; literature device(s) 141; packing device(s) 142; and unit of use packing device(s) 144. The system 100 may also include additional devices, which may communicate with each other over network 104 or directly.

The order processing device 102 may receive information about prescriptions being filled at a pharmacy in which the order processing device 102 is deployed. In general, the order processing device 102 is a device located within or otherwise associated with a pharmacy location to enable fulfillment of a prescription by dispensing prescription drugs. In some embodiments, the order processing device 102 may be a device separate from a pharmacy that enables communication with other devices located within a pharmacy. For example, the order processing device 102 may be in communication with another order processing device 102 and/or other devices 122-144 located with a pharmacy. In some embodiments, an external pharmacy order processing device 102 may have limited functionality (e.g., as operated by a patient requesting fulfillment of a prescription drug) when an internal pharmacy order processing device 102 may have greater functionality (e.g., as operated by a pharmacy).

The order processing device 102 may track a prescription order as it is fulfilled. A prescription order may include one or more than one prescription to be filled by the pharmacy. The order processing device 102 may make pharmacy routing decisions and/or order consolidation decisions for a prescription order. The pharmacy routing decisions include what device or devices in the pharmacy are responsible for filling at least a portion of the prescription order, where the order consolidation decisions include whether portions of a prescription order or multiple prescription orders should be shipped together for a patient or a patient family. The order processing device 102 may operate on its own or in combination with the benefit manager device 106. The order processing device 102 may track and/or schedule the literature or other paperwork associated with each order or multiple prescription orders that are being shipped together.

The devices 102, 106 may include a processor, a memory to store data and instructions, and communication functionality. Other types of electronic devices that can use rules and instructions to execute various functions may also be used.

Examples of the network 104 include Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. The network 104 may include optical communications. The network 104 may be a local area network or a global communication network, such as the Internet. Other conventional and/or later developed wired and wireless networks may also be used. In some embodiments, the network 104 may include a prescribing network such as the electronic prescribing network operated by Surescripts of Arlington, Va.

The benefit manager device 106 is a device operated by an entity at least partially responsible for creation and/or management of the pharmacy or drug benefit. While this benefit manager operating the benefit manager device 106 is typically a pharmacy benefit manager (PBM), other entities may operate the benefit manager device 106 either on behalf of themselves, the PBM, or another entity. For example, the benefit manager may be operated by a health plan, a retail pharmacy chain, a drug wholesaler, a data analytics or other type of software-related company, or the like. In some embodiments, a PBM that provides the pharmacy benefit may also provide one or more than one additional benefits including a medical or health benefit, a dental benefit, a vision benefit, a wellness benefit, a radiology benefit, a pet care benefit, an insurance benefit, a long term care benefit, a nursing home benefit, and the like. The PBM may, in addition to its PBM operations, operate one or more than one pharmacy. The pharmacies may be retail pharmacies, mail order pharmacies, or otherwise.

Some of the operations of the PBM that operates the benefit manager device 106 may include the following. A member (or a person on behalf of the member) of a pharmacy benefit plan administered by or through the PBM attempts to obtain a prescription drug at a retail pharmacy location where the member can obtain drugs in a physical store from a pharmacist or pharmacist technician, or in some instances through mail order drug delivery from a mail order pharmacy location. The member may also obtain a prescription drug directly or indirectly through the use of a machine, such as a kiosk, vending unit, mobile electronic device, or a different type of mechanical, electrical, electronic communication device and/or computing device.

The member may have a co-pay for the prescription drug that reflects an amount of money that the member is responsible to pay the pharmacy for the prescription drug. The money paid by the member to the pharmacy may come from the personal funds of the member, a health savings account (HSA) of the member or the member's family, a health reimbursement arrangement (HRA) of the member or the member's family, a flexible spending accounts (FSA) of the member or the member's family, or the like. An employer of the member may directly or indirectly fund or reimburse the member or an account of the member for the co-pay.

The amount of the co-pay paid by the member may vary by the benefit plan of a plan sponsor or client with the PBM. The member's co-pay may be based on a flat co-pay (e.g., \$10), co-insurance (e.g., 10%), and/or a deductible (e.g., for first \$500 of annual prescription drug spend) for certain prescription drugs, certain types and/or classes of prescription drugs, and/or all prescription drugs.

In certain instances, the member may not pay the co-pay or may only pay for a portion of a co-pay for a prescription drug. For example, if the usual and customary cost for a generic version of a prescription drug is \$4, and the member's flat co-pay is \$20 for the prescription drug, the member may only pay \$4 to receive the prescription drug. In another example involving a worker's compensation claim, no co-pay may be due by the member for the prescription drug. The co-pay may also vary based on the delivery channel used to receive the prescription drug. For example, the co-pay for receiving prescription drug from a mail order pharmacy location may be less than the co-pay for receiving prescription drug from a retail pharmacy location.

In conjunction with receiving the co-pay (if any) from the member and dispensing the prescription drug to the member, the pharmacy submits a claim to the PBM for the prescription drug. The PBM may perform certain adjudication operations including verifying the eligibility of the member, reviewing an applicable formulary of the member to determine appropriate co-pay, coinsurance, and deductible for the prescription drug, and performing a drug utilization review (DUR) on the member. The PBM then provides a response to the pharmacy following performance of at least some of the aforementioned operations. As part of the adjudication, the plan sponsor (or the PBM on behalf of the plan sponsor) ultimately reimburses the pharmacy for filling the prescription drug when the prescription drug was successfully adjudicated. The aforementioned adjudication operations generally occur before the co-pay is received and the prescription drug dispensed. However, the operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be based at least in part on the type of pharmacy network in which the pharmacy is included. Other factors may be used to determine the amount in addition to the type of pharmacy network. For example, if the member pays the pharmacy for the prescription without using the prescription drug benefit provided by the benefit manager, the amount of money paid by the member may be higher and the amount of money received by the pharmacy for dispensing the prescription drug and for the prescription drug itself may be higher. Some or all of the foregoing operations may be performed by executing instructions on the benefit manager device 106 and/or an additional device.

In some embodiments, at least some of the functionality of the order processing device 102 may be included in the benefit manager device 106. The order processing device 102 may be in a client-server relationship with the benefit manager device 106, a peer-to-peer relationship with the benefit manager device 106, or in a different type of relationship with the benefit manager device 106.

The order processing device 102 and/or the benefit manager device 106 may be in communication directly (e.g., through local storage or peer-to-peer connection(s)) and/or through the network 104 (e.g., in a cloud configuration or software-as-a-service) with a database 108 (e.g., as may be retained in memory or otherwise). The database 108 may be deployed on the order processing device 102, the benefit manager device 106, on another device of the system 100, or otherwise. The database 108 may store order data 110, member data 112, claims data 114, drug data 116, prescription data 118, and/or plan sponsor data 120. Other data may be stored in the database 108.

The order data 110 may include data related to the order of prescriptions including the type (e.g., drug name and strength) and quantity of each prescription in a prescription order. The order data 110 may also include data used for completion of the prescription, such as prescription materials and/or the type and/or size of container in which the drug is or is preferably dispensed. In general, prescription materials are a type of order materials that include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, or the like. The order data 110 may be used by a high-volume fulfillment center to fulfill a pharmacy order. In some embodiments, the order data 110 includes verification information associated with fulfillment of the prescription in the pharmacy. For example, the order data 110 may include videos and/or images taken of (i) the prescription drug prior to dispensing, during dispensing, and/or after dispensing, (ii) the prescription container (e.g., a prescription bottle and sealing lid) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other type of verification information such as bar code data read from pallets used to transport prescriptions within the pharmacy may also be stored as order data 110.

The member data 112 includes information regarding the members associated with the benefit manager. The information stored as member data 112 may include personal information, personal health information, protected health information, and the like. Examples of the member data 112 include name, address, telephone number, e-mail address, prescription drug history, and the like. The member data 112 may include a plan sponsor identifier that identifies the plan sponsor associated with the member and/or a member identifier that identifies the member to the plan sponsor. The member data 112 may include a member identifier that identifies the plan sponsor associated with the patient and/or a patient identifier that identifies the patient to the plan sponsor. The member data 112 may also include, by way of example, dispensation preferences such as type of label, type of cap, message preferences, language preferences, or the like. The member data 112 may be accessed by various devices in the pharmacy, e.g., the high-volume fulfillment center, to obtain information utilized for fulfillment and shipping of prescription orders. In some embodiments, an external order processing device 102 operated by or on behalf of a member may have access to at least a portion of the member data 112 for review, verification, or other purposes.

In some embodiments, the member data 112 may include information for persons who are patients of the pharmacy but are not members in a benefit plan being provided by the benefit manager. For example, these patients may obtain drug directly from the pharmacy, through a private label service offered by the pharmacy, the high-volume fulfillment center, or otherwise. In general, the use of the terms member and patient may be used interchangeably herein.

The claims data 114 includes information regarding pharmacy claims adjudicated by the PBM under a drug benefit program provided by the PBM for one, or more than one, plan sponsors. In general, the claims data 114 includes an identification of the client that sponsors the drug benefit program under which the claim is made, and/or the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility. Additional information may be included. In some embodiments, other types of claims beyond prescription drug claims may be stored in the claims data 114. For example, medical claims, dental claims, wellness claims, or other type of health care-related claims for members may be stored as a portion of the claims data 114.

In some embodiments, the claims data 114 includes claims that identify the members with whom the claims are associated. In some embodiments, the claims data 114 includes claims that have been de-identified (e.g., associated with a unique identifier but not with a particular, identifiable member).

The drug data 116 may include drug name (e.g., technical name and/or common name), other names by which the drug is known by, active ingredients, an image of the drug (e.g., in pill form), and the like. The drug data 116 may include information associated with a single medication or multiple medications.

The prescription data 118 may include information regarding prescriptions that may be issued by prescribers on behalf of patients, who may be members of the drug benefit plan, for example to be filled by a pharmacy. Examples of the prescription data 118 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.).

In some embodiments, the order data 110 may be linked to associated member data, claims data 114, drug data 116, and/or prescription data 118.

The plan sponsor data 120 includes information regarding the plan sponsors of the benefit manager. Examples of the plan sponsor data 120 include company name, company address, contact name, contact telephone number, contact e-mail address, and the like.

The order processing device 102 may direct at least some of the operations of the devices 122-144, recited above. In some embodiments, operations performed by one of these devices 122-144 may be performed sequentially, or in parallel with the operations of another device as may be coordinated by the order processing device 102. In some embodiments, the order processing device 102 tracks a prescription with the pharmacy based on operations performed by one or more of the devices 122-144.

In some embodiments, the system 100 may transport prescription drug containers (e.g., between one or more than one of the devices 122-144 in the high-volume fulfillment center) by use of pallets. The pallet sizing and pucking device 122 may configure pucks in a pallet. A pallet may be a transport structure for a number of prescription containers, and may include a number of cavities. A puck may be placed in one or more than one of the cavities in a pallet by the pallet sizing and pucking device 122. A puck may include a receptacle sized and shaped to receive a prescription container. Such containers may be supported by the pucks during carriage in the pallet and during movement through the fulfillment process. Different pucks may have differently sized and shaped receptacles to accommodate containers of differing sizes, as may be appropriate for different prescriptions. Pucks allow the standardization of equipment engaging differently sized drug containers such that some automated equipment can move the drug container by gripping the puck that is supporting the container and allow the use of a standardized pallet that holds a plurality of pucks have a same outer dimension while having differently sized receptacles therein to hold differently sized drug containers. The pucks may also operate to ensure that a drug container is centered in a location on the pallet.

The arrangement of pucks in a pallet may be determined by the order processing device 102 based on prescriptions which the order processing device 102 decides to launch. In general, prescription orders in the order database 110 reside in one or more than one queues, and are generally launched in a first-in-first-out order. However, the order processing device 102 may use logic and a variety of factors to determine when and how prescriptions are to be launched. For example, some non-limiting factors which may alter the first-in-first-out order of launching prescriptions in a pharmacy include the age of the order, whether the order required an outreach to a physician or some other intervention, whether there are any performance guarantees with plan sponsors or members, the available inventory of a given pharmaceutical in view of existing prescriptions already launched which will require that pharmaceutical, the zip code to which the order will be shipped, the workload and volume of various parts of the pharmacy, whether valid paperwork for the order has been received, and/or similar orders for the same pharmaceutical that are already to be launched. The logic may be implemented directly in the pallet sizing and pucking device 122, in the order processing device 102, in both devices 102, 122, or otherwise. Once a prescription is set to be launched, a puck suitable for the appropriate size of container for that prescription may be positioned in a pallet by a robotic arm or pickers. The pallet sizing and pucking device 122 may launch a pallet once pucks have been configured in the pallet. The loading device 124 may load prescription containers into the pucks on a pallet by a robotic arm, pick and place mechanism, or the like. In one embodiment, the loading device 108 has robotic arms or pickers to grasp a prescription container and move it to and from a pallet. The loading device 124 may also print a label which is appropriate for a container that is to be loaded onto the pallet, and apply the label to the container. The pallet may be located on a conveyor assembly during these operations. In an example embodiment, the drug containers may be positioned in the pucks by the loading device 124 prior to the pucks being placed in the pallet. The inspect device 126 may verify that containers in a pallet are correctly labeled and in the correct spot on the pallet. The inspect device 126 may scan the label on one or more than one container on the pallet. Labels of containers may be scanned or imaged in full or in part by the inspect device 126. Such imaging may occur after the container has been lifted out of its puck by a robotic arm, picker, or the like, or may be otherwise scanned or imaged while retained in the puck. In some embodiments, images and/or video captured by the inspect device 126 may be stored in the database 108 as order data 110.

The unit of use device 128 may temporarily store, monitor, label and/or dispense unit of use products. In general, unit of use products are prescription drug products that may be delivered to a patient or member without being repackaged at the pharmacy. These products may include pills in container, pills in a blister pack, inhalers, and the like. Pills to be placed in a container may include, and not be limited to, capsules, tablets, caplets, lozenges, and other solid medium with a pharmaceutical component that may be ingested by a person or other mammal. Prescription drug products dispensed by the unit of use device 128 may be packaged individually or collectively for shipping, or may be shipped in combination with other prescription drugs dispensed by other devices in the high volume fulfillment center.

The automated dispensing device 130 may include one or more than one device that dispense prescription drugs or pharmaceuticals into prescription containers in accordance with one or multiple prescription orders. In general, the automated dispensing device 130 may include mechanical and electronic components with, in some embodiments, software and/or logic to facilitate pharmaceutical dispensing that would otherwise be performed in a manual fashion by a pharmacist and/or pharmacist technician. For example, the automated dispensing device 130 may include high volume fillers that fill a number of prescription drug types at a rapid rate and blister pack machines that dispense and pack drugs into a blister pack or other pre-packaged form of pills. Prescription drugs dispensed by the automated dispensing devices 130 may be packaged individually or collectively for shipping, or may be shipped in combination with other prescription drugs dispenses by other devices in the high volume fulfillment center.

The automated dispensing device 130 may be used, for example, to dispense commonly prescribed dispense drugs in an automatic or semiautomatic method into containers. Drugs may be dispensed in connection with filling one or more than one prescriptions (or portions of prescriptions). Drugs dispensed by the automated dispensing device 130 may be tablets, pills, capsules, caplets, or other types of drugs suitable for dispensing by the automated dispensing device 130.

The manual fulfillment device 132 may provide for manual fulfillment of prescriptions. For example, the manual fulfillment device 132 may receive or obtain a container and enable fulfillment of the container by a pharmacist or pharmacy technician. In some embodiments, the manual fulfillment device 132 provides the filled container to another device in the system 100. In an example embodiment, the container may be joined with other containers in a prescription order for a patient or member, e.g., on a pallet or at the accumulation device 140. In general, a manual fulfillment may include operations at least partially performed by a pharmacist or pharmacy technician. For example, a person may retrieve a supply of the prescribed drug, may make an observation, may count out a prescribed quantity of drugs and place them into a prescription container, or the like. Some portions of the manual fulfillment process may be automated by use of a machine. For example, counting of capsules, tablets, or pills may be at least partially automated (e.g., through use of a pill counter). Prescription drugs dispensed by the manual fulfillment device 132 may be packaged individually or collectively for shipping, or may be shipped in combination with other prescription drugs dispenses by other devices in the high volume fulfillment center.

The review device 134 may process prescription containers to be reviewed by a pharmacist for proper pill count, exception handling, prescription verification, and the like. Fulfilled prescriptions may be manually reviewed and/or verified by a pharmacist, as may be required by state or local law. A pharmacist or other licensed pharmacy person who may dispense certain drugs in compliance with local and/or other laws may operate the review device 134 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been cancelled, containers with defects, and the like. In an example embodiment, the manual review can be performed at the manual station.

The imaging device 136 may image containers after they have been filled with pharmaceuticals. The imaging device 136 may measure the fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 102, and/or stored in the database 110 as part of the order data 110.

The cap device 138 may be used to cap or otherwise seal a prescription container, e.g., with structures that are equivalent to a cap. In some examples, a cap as used herein can be a protective lid, a sealing cover that engages the container, a stopple, bung or the like. Such alternative caps should be capable of resisting environmental components, e.g., moisture, from entering the container interior or trapping the medication, e.g., liquids or individual solids (e.g., pills, gelcaps, tablets and other germane solids) within the interior of the container. In some embodiments, the cap device 138 may secure a prescription container with a type of cap in accordance with a patient preference (e.g., a preference regarding child resistance), a plan sponsor preference, a prescriber preference, or the like. The cap device 138 includes the cap orientation detector 50 in an example embodiment. The cap device 138 may also etch a message into the cap or otherwise associate a message into the cap, although this process may be performed by a subsequent device in the high-volume fulfillment center. Etching may be performed according to the teachings in U.S. patent application Ser. No. 14/313,042, which is hereby incorporated by reference. The accumulation device 140 accumulates various containers of prescription drugs in a prescription order. The accumulation device 140 may accumulate prescription containers from various devices or areas of the pharmacy. For example, the accumulation device 140 may accumulate prescription containers from the unit of use device 128, the automated dispensing device 130, the manual fulfillment device 132, and the review device 134, at the high-volume fulfillment center. The accumulation device 140 may be used to group the prescription containers prior to shipment to the member or otherwise. In some embodiments, the literature device 141 folds or otherwise prepares the literature for inclusion with a prescription drug order (e.g., in a shipping container). In some embodiments, the literature device 141 that prints the literature may be separate from the literature device that prepares the literature for inclusion with a prescription order.

The packing device 142 packages a prescription order in preparation for shipping the order. The packing device 142 may box, bag, or otherwise package the fulfilled prescription order for delivery. The packing device 142 may further place inserts, e.g., literature or other papers into the packaging received from the literature device 141 or otherwise. For example, bulk prescription orders may be shipped in a box, while other prescription orders may be shipped in a bag which may be a wrap seal bag. The packing device 142 may label the box or bag with the address and a recipient's name. The label may be printed and affixed to the bag or box, be printed directly onto the bag or box, or otherwise associated with the bag or box. The packing device 142 may sort the box or bag for mailing in an efficient manner (e.g., sort by delivery address). The packing device 142 may include ice or temperature sensitive elements for prescriptions which are to be kept within a temperature range during shipping in order to retain efficacy or otherwise. The ultimate package may then be shipped through postal mail, through a mail order delivery service that ships via group and/or air (e.g., UPS, FEDEX, or DHL), through delivery service, through a local delivery service (e.g., a courier service), through a locker box at a shipping site (e.g., an AMAZON locker or a post office box), or otherwise.

The unit of use packing device 144 packages a unit of use prescription order in preparation for shipping the order. The unit of use packing device 144 may include manual scanning of containers to be bagged for shipping to verify each container in the order. In an example embodiment, the manual scanning may be performed at a manual station.

Figure 1:
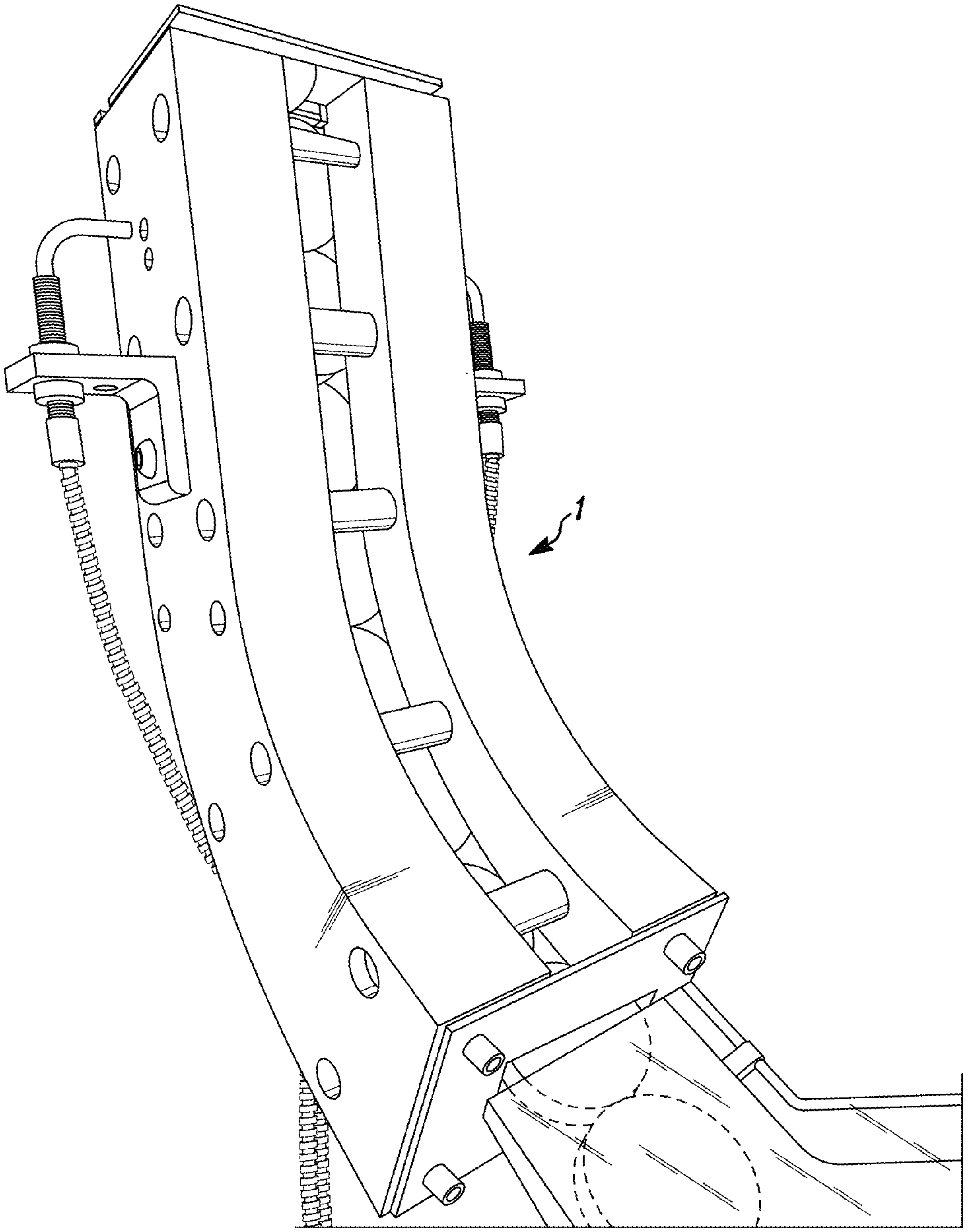
FIG. 1 (PRIOR ART)
FIG. 1 is an image of a conventional cap feeder.

While the system 100 in FIG. 1 is shown to include single devices 102, 106, 122-144 multiple devices may be used. The devices 102, 106, 122-144 may be the same type or model of device or may be different device types or models. When multiple devices are present, the multiple devices may be of the same device type or models or may be a different device type or model. The types of devices 102, 106, 122-144 shown in FIG. 1 are example devices. In other configurations of the system 100, lesser, additional, or different types of devices may be included.

Moreover, the system 100 shows a single network 104; however, multiple networks can be used. The multiple networks may communicate in series with each other to link the devices 102, 106, 122-144 or in parallel to link the devices 102, 106, 122-144. Multiple devices may share processing and/or memory resources. The devices 102, 106, 122-144 may be located in the same area or in different locations. For example, the devices 102, 106, 122-144 may be located in a building or set of adjoining buildings. The devices 102, 106, 122-144 may be interconnected (e.g. by conveyors), networked, and/or otherwise in contact with one another or integrated with one another e.g., at the high volume fulfillment center. In addition, the functionality of a device may be split among a number of discrete devices and/or combined with other devices.

The system 100 may include a single database, or multiple databases, maintained by respective devices operated by or on behalf one or a number of different persons and/or organizations. The communication may occur directly (e.g., through local storage) and/or through the network 104 (e.g., in a cloud configuration or software-as-a-service) with a device that stores a respective database.

Another pharmacy system is described in U.S. patent Ser. No. 10/800,565 ('565 patent), filed 7 May 2015, titled "Systems and Methods for Capping," hereby incorporated by reference. The presently described cap detection methods and systems could work with the pharmacy system. For example, the cap detection could be part of the cap device in FIG. 3 of the '565 patent. The cap detection could be part of the cap device feeder 402 of the '565 patent. The cap detection could be part of the primary chute 502 of the '565 patent. In an example, the cap detection could be upstream relative to the flow of caps from the cap device feeder 402. In an example, where there are multiple chutes for caps, at least one cap detection can be on each chute.

Having described the disclosure in detail, it will be apparent that modifications and variations are possible without departing from the scope of the disclosure defined in the appended claims.

When introducing elements of the present disclosure or the preferred embodiments(s) thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that the several objects of the disclosure are achieved, and other advantageous results attained.

As various changes could be made in the above constructions without departing from the scope of the disclosure, it is intended that all matter contained in the above description and shown in the accompanying drawings shall be interpreted as illustrative and not in a limiting sense.

What is claimed is:

1. A cap feeder for supplying caps; the cap feeder comprising:

a cap track defining a cap pathway along which the caps move, one after another;

a cap orientation detector arranged to be contacted by the caps as the caps move along the cap pathway, the cap orientation detector configured to detect when one cap of the caps is in a first orientation and is arranged to stop said one cap in the first orientation from continuing to move along the cap pathway; and wherein the cap track includes a cap opening sized and shaped to permit a cap of the plurality of caps to pass through the cap opening, the cap opening being proximate to the cap orientation detector and arranged to permit said one cap in the first orientation to leave the cap pathway;

wherein the cap track includes a cap door configured to close the cap opening.

2. The cap feeder of claim 1, wherein the cap orientation detector is configured to permit one cap of the caps in a second orientation to continue to move along the cap pathway, past the cap orientation detector.

3. The cap feeder of claim 2, wherein the cap orientation detector is arranged relative to the cap pathway in such a way that:

said one cap in the first orientation is oriented so that a mouth of said one cap in the first orientation faces away from the cap orientation detector when said one cap in the first orientation contacts the cap orientation detector; and said one cap in the second orientation is oriented so that a mouth of said one cap in the second orientation faces toward the cap orientation detector when said one cap in the second orientation contacts the cap orientation detector.

4. The cap feeder of claim 1, wherein the cap orientation detector is configured to rotate about an axis of rotation.

5. The cap feeder of claim 4, wherein the cap orientation detector is freely rotatable about the axis of rotation.

6. The cap feeder of claim 4, wherein the cap orientation detector includes a bearing.

7. The cap feeder of claim 4, wherein the cap orientation detector is supported by the cap track.

8. The cap feeder of claim 1, wherein the cap track includes a magnetic closure configured to hold the door in a closed position where the cap door closes the cap opening.

9. The cap feeder of claim 8, wherein the cap door includes a plug arranged to be disposed in the cap opening when the door is in the closed position.

10. The cap feeder of claim 1, further comprising a cap ejector configured to eject said one cap in the first orientation from the cap pathway.

11. The cap feeder of claim 1, further comprising a first cap sensor arranged to detect the presence of at least one cap at a location downstream of the cap orientation detector and a second cap sensor arranged to detect the presence of at least one cap at a location at or upstream of the cap orientation detector.

12. The cap feeder of claim 1, further comprising at least one cap guide configured to reduce a thickness of the cap pathway to conform the cap pathway to different sizes of caps.

13. The cap feeder of claim 12, wherein the at least one cap guide is a detector cap guide supported by the cap track, the detector cap guide including a cap guide surface disposed along the cap pathway opposite the cap orientation detector, wherein the cap guide surface is arranged such that the caps move along the cap guide surface as the caps move past the cap orientation detector.

14. The cap feeder of claim 12, wherein the at least one cap guide is an alignment cap guide supported by the cap track, the alignment cap guide being disposed along the cap pathway at an outlet of the cap track and arranged to guide the caps as the caps move through the outlet.

15. A cap feeder for supplying caps; the cap feeder comprising:

a cap track defining a cap pathway along which the caps move, one after another;

a cap orientation detector including a plurality of lobes arranged to be contacted by the caps as the caps move along the cap pathway, the lobes configured to detect when one cap of the caps is in a first orientation, the cap orientation detector arranged along a centerline of the cap pathway;

wherein the cap track includes a cap opening sized and shaped to permit a cap of the plurality of caps to pass through the cap opening, the cap opening being proximate to the cap orientation detector and arranged to permit said one cap in the first orientation to leave the cap pathway;

wherein the cap track includes a cap door configured to close the cap opening.

16. The cap feeder of claim 15, wherein the plurality of lobes is configured such that there is always one lobe of the plurality of lobes arranged to be contacted by the caps as the caps move along the cap pathway.

17. The cap feeder of claim 15, wherein each lobe of the plurality of lobes is sized and shaped to be able to extend into mouths of the caps.

18. The cap feeder of claim 15, wherein each lobe of the plurality of lobes has a rounded end.

19. The cap feeder of claim 15, wherein each lobe of the plurality of lobes is sized and shaped to not extend through the cap pathway.

20. The cap feeder of claim 15, wherein each lobe of the plurality of lobes is configured to jam said one cap in the first orientation in the cap track.

21. The cap feeder of claim 15, wherein the cap track includes a magnetic closure configured to hold the door in a closed position where the cap door closes the cap opening and the door being positioned to receive the cap in the first position when released from the lobe.

22. The cap feeder of claim 15, wherein the cap door includes a plug arranged to be disposed in the cap opening when the door is in the closed position.

* * * * *